United States Patent
Han et al.

(10) Patent No.: US 9,304,620 B2
(45) Date of Patent: Apr. 5, 2016

(54) TOUCH SENSOR INTEGRATED TYPE DISPLAY DEVICE

(71) Applicant: LG Display Co., Ltd., Seoul (KR)

(72) Inventors: Manhyeop Han, Seoul (KR); Cheolse Kim, Daegu (KR); Jinseong Kim, Jeollabuk-do (KR)

(73) Assignee: LG Display Co., Ltd., Seoul (KR)

( * ) Notice: Subject to any disclaimer, the term of this patent is extended or adjusted under 35 U.S.C. 154(b) by 75 days.

(21) Appl. No.: 14/096,222

(22) Filed: Dec. 4, 2013

(65) Prior Publication Data

US 2014/0168149 A1    Jun. 19, 2014

(30) Foreign Application Priority Data

Dec. 13, 2012    (KR) .................. 10-2012-0145331

(51) Int. Cl.
*G06F 3/044* (2006.01)
*G06F 3/041* (2006.01)

(52) U.S. Cl.
CPC .............. *G06F 3/0412* (2013.01); *G06F 3/044* (2013.01); *G06F 3/0418* (2013.01); *G06F 2203/04107* (2013.01)

(58) Field of Classification Search
CPC ...... G06F 3/041; G06F 3/0412; G06F 3/0418; G06F 3/044
See application file for complete search history.

(56) References Cited

U.S. PATENT DOCUMENTS

| 2008/0062140 A1* | 3/2008 | Hotelling et al. ............. 345/173 |
| 2014/0049505 A1* | 2/2014 | Radivojevic et al. ......... 345/174 |

* cited by examiner

*Primary Examiner* — Mark Regn
(74) *Attorney, Agent, or Firm* — Morgan, Lewis & Bockius LLP

(57) ABSTRACT

A touch sensor integrated type display device includes gate lines and data lines crossing over each other, pixel electrodes respectively formed in areas defined by crossing the gate lines and the data lines, first electrodes, each of which is formed between the pixel electrodes and in parallel with the gate line, the pixel electrodes being adjacent to each other with the gate line interposed therebetween, second electrodes formed in parallel with the data lines to overlap the pixel electrode, first routing wires connecting some of the first electrodes to form first electrode groups arranged in a first direction, second routing wires connecting another some of the first electrodes to form second electrode groups arranged in the first direction; and third routing wires connecting some of the second electrodes to form third electrode groups arranged in a second direction.

15 Claims, 15 Drawing Sheets

TOUCH SENSOR INTEGRATED TYPE DISPLAY DEVICE

This application claims the benefit of priority under 35 U.S.C. §119(a) to Korea Patent Application No. 10-2012-0145331 filed on Dec. 13, 2012, the entire contents of which is incorporated herein by reference herein in its entirety.

BACKGROUND OF THE INVENTION

1. Field of the Invention

Embodiments of the invention relate to a touch sensor integrated type display device capable of recognizing a user's touch operation, and more particularly to a touch sensor integrated type display device capable of increasing sensitivity of a touch sensor by reducing mutual capacitance between touch driving electrodes and touch sensing electrodes.

2. Discussion of the Related Art

In recent years, various input devices such as a keyboard, a mouse, a joystick, and a digitizer have been used to construct interfaces between users and home appliances or information telecommunication devices. However, when the user makes use of these input devices, user's dissatisfaction increases because the user is required to know how to use the input devices and the input devices occupy space. Therefore, a convenient and simple input device that can reduce erroneous operation is required. In response to this demand, a touch sensor for enabling the user to input information by directly touching the screen with his or her hand or a pen was suggested.

The touch sensor has a simple configuration capable of reducing erroneous operations. The user can also perform an input action without using a separate input device, and can quickly and easily manipulate a device through contents displayed on the screen. Accordingly, the touch sensor has been applied to various display devices.

The touch sensor used in the display devices may be classified into an add-on type touch sensor and an on-cell type touch sensor. The add-on type touch sensor is configured such that the display device and the add-on type touch sensor are individually manufactured and then the add-on type touch sensor is attached to an upper substrate of the display device. The on-cell type touch sensor is configured such that components constituting the on-cell type touch sensor are directly formed on the surface of the upper glass substrate of the display device.

There is a problem that a thickness of the display device increases because the add-on type touch sensor has the structure in which the add-on type touch sensor is mounted on the display device. Further, the visibility of the display device is reduced because of a reduction in brightness of the display device due to the increased thickness.

On the other hand, the on-cell type touch sensor shares the glass substrate with the display device because the on-cell type touch sensor has the structure in which the on-cell type touch sensor is formed on the surface of the glass substrate of the display device. Therefore, a thickness of the display device using the on-cell type touch sensor is less than a thickness of the display device using the add-on type touch sensor. However, the entire thickness of the display device using the on-cell type touch sensor increases because of a touch driving electrode layer, a touch sensing electrode layer, and an insulating layer for insulating the touch driving electrode layer and the touch sensing electrode layer which constitute the on-cell type touch sensor.

Accordingly, there is a need for a touch sensor integrated type display device capable of solving the problems of the above-described kinds of touch sensors.

SUMMARY OF THE INVENTION

Embodiments of the invention provide a touch sensor integrated type display device capable of reducing its thickness and increasing touch sensitivity by also using a component of the display device as touch driving electrodes and touch sensing electrodes for recognizing a touch operation of the display device.

Embodiments of the invention also provide a touch sensor integrated type display device capable of increasing touch sensitivity and reducing a parasitic capacitance by reducing mutual capacitance between touch driving electrodes and touch sensing electrodes.

In one aspect, there is a touch sensor integrated type display device including a plurality of gate lines and a plurality of data lines which are formed to cross over each other; a plurality of pixel electrodes respectively formed in areas defined by a crossing structure of the plurality of gate lines and the plurality of data lines; a plurality of first electrodes, each of which is formed between the pixel electrodes and in parallel with the gate line, the pixel electrodes being adjacent to each other with the gate line interposed therebetween; a plurality of second electrodes formed in parallel with the data lines, at least a portion of each of the plurality of second electrodes overlapping the pixel electrode; a plurality of first routing wires, each of which connects some of the plurality of first electrodes based on a first predetermined number to form a plurality of first electrode groups each including the some of the plurality of first electrodes arranged in a first direction; a plurality of second routing wires, each of which connects another some of the plurality of first electrodes based on a second predetermined number to form a plurality of second electrode groups each including the another some of the first plurality of electrodes arranged in the first direction; and a plurality of third routing wires, each of which connects some of the plurality of second electrodes based on a third predetermined number to form a plurality of third electrode groups each including the some of the plurality of second electrodes arranged in a second direction crossing the first direction, wherein the plurality of first electrode groups and the plurality of second electrode groups are alternately disposed, and a ratio of the number of first electrodes included in each first electrode group to the number of first electrodes included in each second electrode group is m:1, where m is a natural number, and wherein the plurality of second routing wires are connected to ground.

The touch sensor integrated type display device further includes comprising a plurality of fourth routing wires, each of which connects another some of the plurality of second electrodes based on a fourth predetermined number to form a plurality of fourth electrode groups each including the another some of the plurality of second electrodes arranged in the second direction, wherein the plurality of third electrode groups and the fourth electrode groups are alternately disposed, and a ratio of the number of second electrodes included in each third electrode group to the number of second electrodes included in each fourth electrode group is n:1, where n is a natural number, and wherein the fourth routing wires are connected to a power supply unit supplying a common voltage during a display operation, and are connected to ground during a touch operation.

The touch sensor integrated type display device further includes at least one first resistance reducing wire configured to overlap each of the plurality of first electrodes along a direction of the first electrodes and reduce resistances of the first electrodes, wherein the first electrodes of the second electrode group are connected to the second routing wires through the at least one first resistance reducing wire.

The touch sensor integrated type display device further includes at least one second resistance reducing wire configured to overlap each of the plurality of second electrodes along a direction of the second electrodes and reduce resistances of the second electrodes, wherein the second electrodes of the fourth electrode group are connected to the fourth routing wires through the at least one second resistance reducing wire.

In another aspect, there is a touch sensor integrated type display device includes a plurality of gate lines formed in parallel on a first substrate; a gate insulating layer configured to cover the gate lines; a plurality of data lines formed on the gate insulating layer to cross the gate lines; a plurality of thin film transistors respectively formed in a plurality of pixel areas defined by a crossing structure of the gate lines and the data lines; a first passivation layer configured to cover the gate insulating layer, on which the plurality of thin film transistors are formed; a plurality of pixel electrodes formed on the first passivation layer in the plurality of pixel areas, respectively; a plurality of first electrodes, each of which is formed between the pixel electrodes and in parallel with the gate line, the pixel electrodes being adjacent to each other with the gate line interposed therebetween; a second passivation layer configured to cover the plurality of first electrodes; a plurality of second electrodes formed on the second passivation layer in parallel with the data lines, at least a portion of each of the plurality of second electrodes overlapping the pixel electrode; a plurality of first routing wires, each of which connects some of the plurality of first electrodes based on a first predetermined number to form a plurality of first electrode groups each including the some of the plurality of first electrodes arranged in a first direction; a plurality of second routing wires, each of which connects another some of the plurality of first electrodes based on a second predetermined number to form a plurality of second electrode groups each including the another some of the first plurality of electrodes arranged in the first direction; and a plurality of third routing wires, each of which connects some of the plurality of second electrodes based on a third predetermined number to form a plurality of third electrode groups each including the some of the plurality of second electrodes arranged in a second direction crossing the first direction, wherein the plurality of first electrode groups and the plurality of second electrode groups are alternately disposed, and a ratio of the number of first electrodes included in each first electrode group to the number of first electrodes included in each second electrode group is m:1, where m is a natural number, and wherein the plurality of second routing wires are connected to ground.

The touch sensor integrated type display device further includes a plurality of fourth routing wires, each of which connects another some of the plurality of second electrodes based on a fourth predetermined number to form a plurality of fourth electrode groups each including the another some of the plurality of second electrodes arranged in the second direction, wherein the plurality of third electrode groups and the fourth electrode groups are alternately disposed, and a ratio of the number of second electrodes included in each third electrode group to the number of second electrodes included in each fourth electrode group is n:1, where n is a natural number, and wherein the fourth routing wires are connected to a power supply unit supplying a common voltage during a display operation, and are connected to ground during a touch operation.

The touch sensor integrated type display device further includes at least one first resistance reducing wire configured to overlap each of the plurality of first electrodes along a direction of the first electrodes and reduce resistances of the first electrodes, wherein the first electrodes of the second electrode group are connected to the second routing wires through the at least one first resistance reducing wire.

The touch sensor integrated type display device further includes at least one second resistance reducing wire configured to overlap each of the plurality of second electrodes along a direction of the second electrodes and reduce resistances of the second electrodes, wherein the second electrodes of the fourth electrode group are connected to the fourth routing wires through the at least one second resistance reducing wire.

In yet another aspect, there is a touch sensor integrated type display device including a plurality of gate lines formed in parallel on a first substrate; a gate insulating layer configured to cover the gate lines; a plurality of data lines formed on the gate insulating layer to cross the gate lines; a plurality of thin film transistors respectively formed in a plurality of pixel areas defined by a crossing structure of the gate lines and the data lines; a first passivation layer configured to cover the gate insulating layer, on which the plurality of thin film transistors are formed; a plurality of first electrodes, each of which is formed on the first passivation layer in parallel with the data lines and formed in at least two pixel areas, which are adjacent to each other with the gate line interposed therebetween; a second passivation layer configured to cover the plurality of first electrodes; a plurality of pixel electrodes formed on the second passivation layer in the plurality of pixel areas, respectively, at least a portion of each of the plurality of pixel electrodes overlapping the first electrode; a plurality of second electrodes, each of which is formed on the second passivation layer in parallel with the gate line and are formed between the pixel electrodes and in parallel with the gate line, the pixel electrodes being adjacent to each other with the gate line interposed therebetween; a plurality of first routing wires, each of which connects some of the plurality of second electrodes based on a first predetermined number to form a plurality of first electrode groups each including the some of the plurality of second electrodes arranged in a first direction; a plurality of second routing wires, each of which connects another some of the plurality of second electrodes based on a second predetermined number to form a plurality of second electrode groups each including the another some of the plurality of second electrodes arranged in the first direction; and a plurality of third routing wires, each of which connects some of the plurality of first electrodes based on a third predetermined number to form a plurality of third electrode groups each including the some of the plurality of first electrodes arranged in a second direction crossing the first direction, wherein the plurality of first electrode groups and the plurality of second groups are alternately disposed, and a ratio of the number of second electrodes included in each first electrode group to the number of second electrodes included in each second electrode group is m:1, where m is a natural number, and wherein the plurality of second routing wires are connected to ground.

The touch sensor integrated type display device further includes a plurality of fourth routing wires, each of which connects the anther some of the plurality of first electrodes based on a fourth predetermined number to form a plurality of fourth electrode groups each including the first electrodes arranged in the second direction, wherein the third electrode groups and the fourth electrode groups are alternately disposed, and a ratio of the number of first electrodes included in each third electrode group to the number of first electrodes included in each fourth electrode group is n:1, where n is a natural number, wherein the fourth routing wires are connected to a power supply unit supplying a common voltage during a display operation is performed, and are connected to ground during a touch operation.

The touch sensor integrated type display device further includes at least one first resistance reducing wire configured to overlap each of the plurality of second electrodes along a direction of the second electrodes and reduce resistances of the second electrodes, wherein the second electrodes of the second electrode group are connected to the second routing wires through the at least one first resistance reducing wire.

The touch sensor integrated type display device further includes at least one second resistance reducing wire configured to overlap each of the plurality of first electrodes along a direction of the first electrodes and reduce resistances of the first electrodes, wherein the first electrodes of the fourth electrode group are connected to the fourth routing wires through the at least one second resistance reducing wire.

As described above, the touch sensor integrated type display device according to the embodiments of the invention can use the common electrode, which is used to form an electric field required to drive liquid crystals of the display device, along with the pixel electrode as the touch driving electrode or the touch sensing electrode, and thus additional touch driving and touch sensing electrodes do not need to be formed. Hence, a process for forming the touch driving electrode or the touch sensing electrode can be omitted, and a thickness of the touch sensor integrated type display device can be reduced by a thickness of the touch driving electrode or the touch sensing electrode.

Furthermore, the touch sensor integrated type display device according to the embodiments of the invention can reduce the number of touch driving electrodes and the number of touch sensing electrodes used as the touch effective electrode by connecting some of the touch driving electrodes, some of the touch sensing electrodes, or some of the touch driving electrodes and some of the touch sensing electrodes to the ground. Hence, the touch sensor integrated type display device according to the embodiments of the invention can reduce the mutual capacitance between the touch driving electrodes and the touch sensing electrodes, thereby making it possible to prevent a reduction in the touch sensitivity and an increase in the parasitic capacitance and further improve a touch performance.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
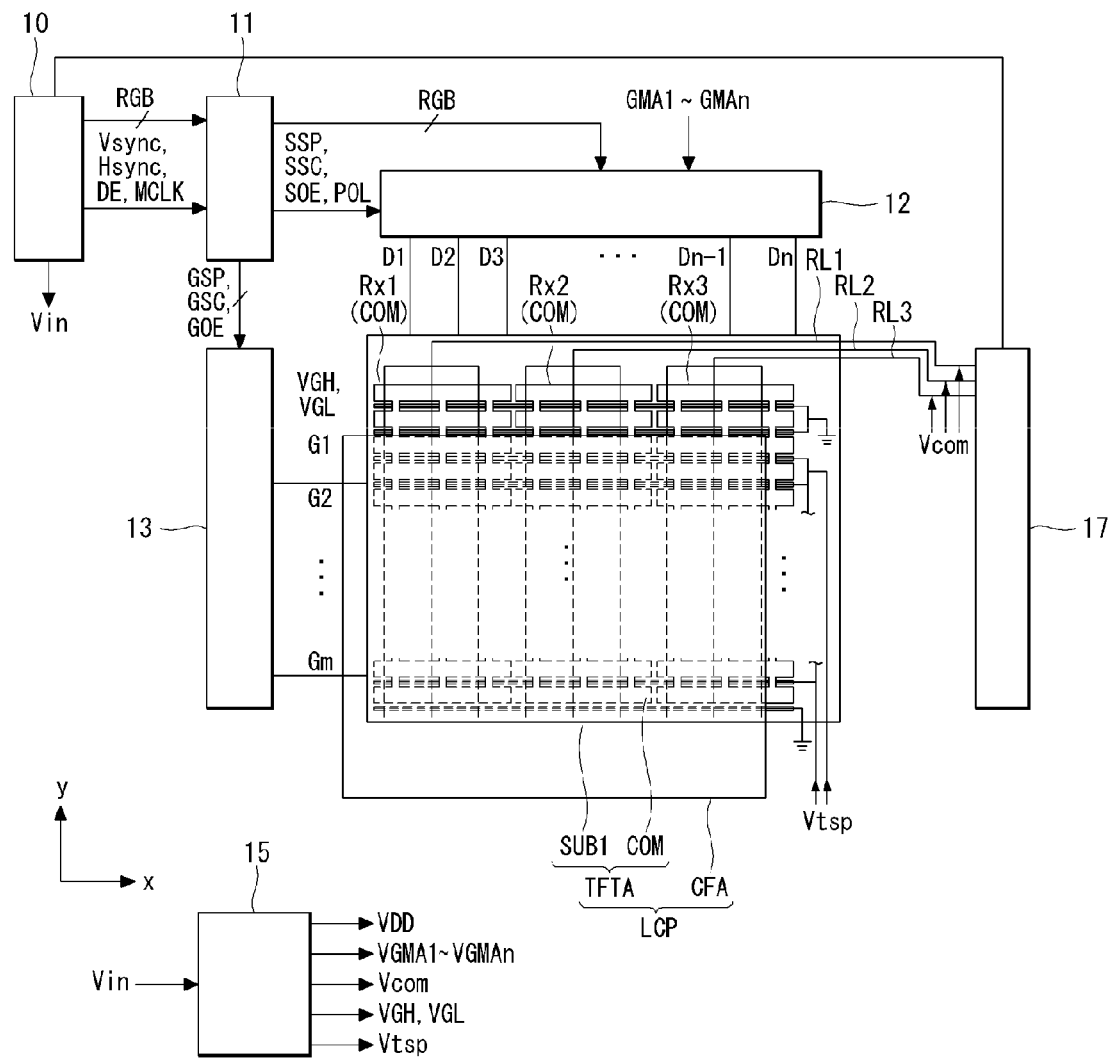
FIG. 1 is a block diagram schematically showing a touch sensor integrated type display device according to a first embodiment of the invention.

Hereinafter, exemplary embodiments of this disclosure will be described in detail with reference to the accompanying drawings, wherein same reference numerals may be used to denote the same or substantially the same elements throughout the specification and the drawings.

Figure 2:
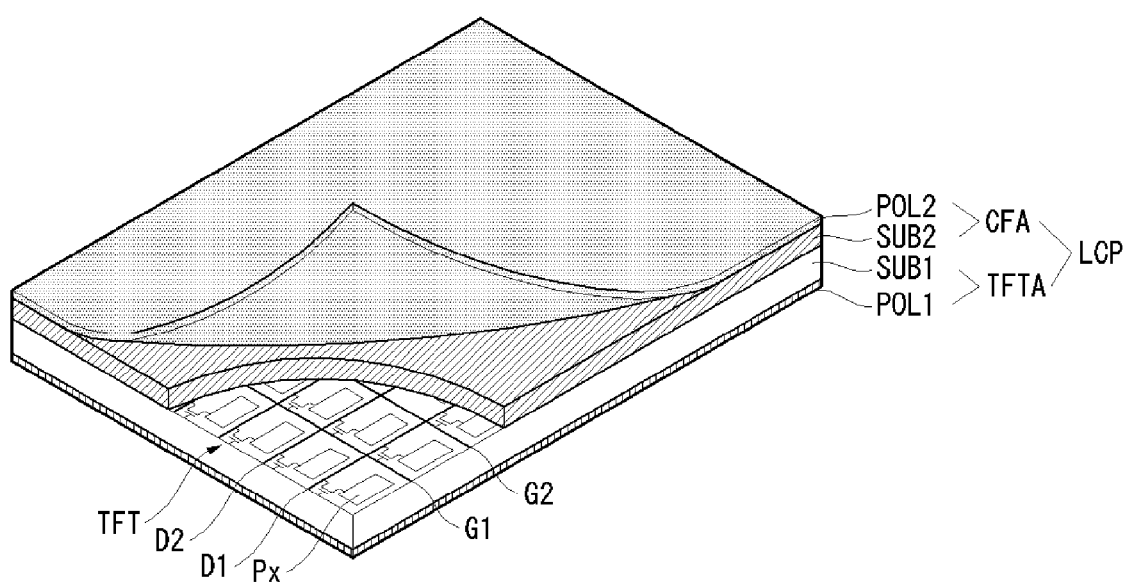
FIG. 2 is a partial exploded perspective view schematically showing the touch sensor integrated type display device shown in FIG. 1.

A touch sensor integrated type display device according to a first embodiment of the invention is described in detail with reference to FIGS. 1 and 2. FIG. 1 is a block diagram schematically showing a touch sensor integrated type display device according to a first embodiment of the invention. FIG. 2 is a partial exploded perspective view schematically showing the touch sensor integrated type display device shown in FIG. 1.

In the following description, a touch sensor integrated type liquid crystal display is used as an example of the touch sensor integrated type display device.

As shown in FIGS. 1 and 2, a touch sensor integrated type liquid crystal display according to the first embodiment of the invention includes a liquid crystal display panel LCP, a host controller 10, a timing controller 11, a data driver 12, a gate driver 13, a power supply unit 15, and a touch recognition processor 17.

The liquid crystal display panel LCP includes a color filter array CFA and a thin film transistor (TFT) array TFTA which are positioned opposite each other with a liquid crystal layer (not shown) interposed therebetween.

The TFT array TFTA includes a plurality of gate lines G1, G2, G3, ..., Gm−1, and Gm which are formed in parallel on a first substrate SUB1 in a first direction (for example, x-axis direction), a plurality of data lines D1, D2, D3, ..., Dn−1, and Dn which are formed in parallel in a second direction (for example, y-axis direction) to cross over the plurality of gate lines G1, G2, G3, ..., Gm−1, and Gm, thin film transistors TFT formed at crossings of the gate lines G1, G2, G3, ..., Gm−1, and Gm and the data lines D1, D2, D3, ... Dn−1, and Dn, a plurality of pixel electrodes Px for charging a data voltage to liquid crystal cells, and a plurality of common electrodes COM positioned opposite the plurality of pixel electrodes Px.

The color filter array CFA includes black matrixes (not shown) and color filters (not shown) formed on a second substrate SUB2. Polarizing plates POL1 and POL2 are respectively attached to outer surfaces of the first substrate SUB1 and the second substrate SUB2 of the liquid crystal display panel LCP. Alignment layers (not shown) for setting a pre-tilt angle of liquid crystals are respectively formed on inner surfaces of the first substrate SUB1 and the second substrate SUB2 contacting the liquid crystals. A column spacer may be formed between the first substrate SUBS1 and the second substrate SUBS2 to maintain cell gaps of the liquid crystal cells.

A backlight unit (not shown) is disposed under the TFT array TFTA. The backlight unit includes a plurality of light sources to uniformly irradiate light onto the TFT array TFTA and the color filter array CFA. The backlight unit may be implemented as one of an edge type backlight unit and a direct type backlight unit. The light sources of the backlight unit may include one or at least two of a hot cathode fluorescent lamp (HCFL), a cold cathode fluorescent lamp (CCFL), an external electrode fluorescent lamp (EEFL), and a light emitting diode (LED).

The common electrodes COM are formed on the second substrate SUB2 in a vertical electric field driving manner such as a twisted nematic (TN) mode and a vertical alignment (VA) mode. Alternatively, the common electrodes COM are formed on the first substrate SUB1 along with the pixel electrodes Px in a horizontal electric field driving manner such as an in-plane switching (IPS) mode and a fringe field switching (FFS) mode. In the embodiment of the invention, the common electrodes COM in the horizontal electric field driving manner are described as an example.

Figure 3:
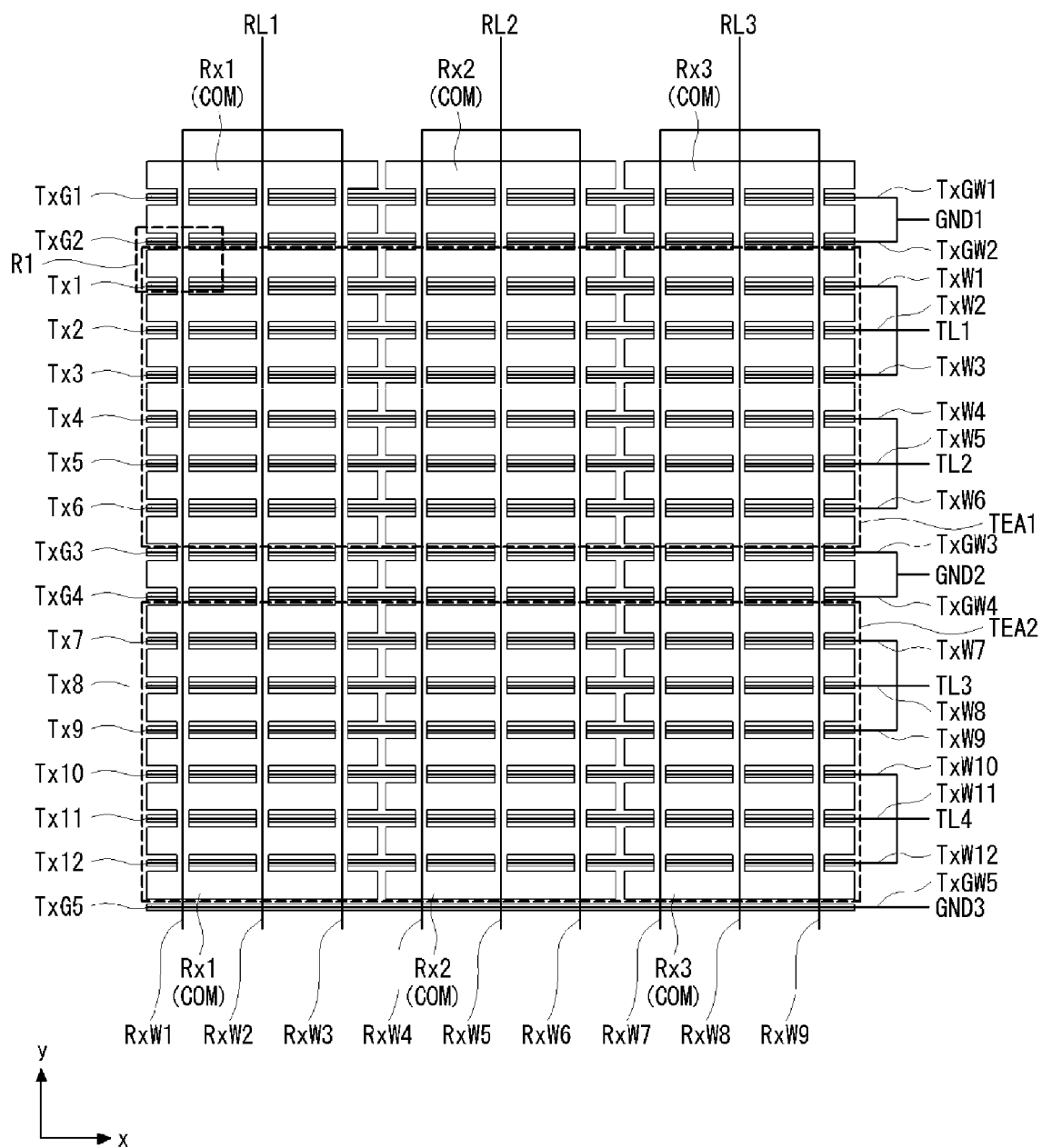
FIG. 3 is a plane view schematically showing an example of a touch effective area formed by touch driving electrodes and touch sensing electrodes in the touch sensor integrated type display device according to the first embodiment of the invention.
Figure 4A:
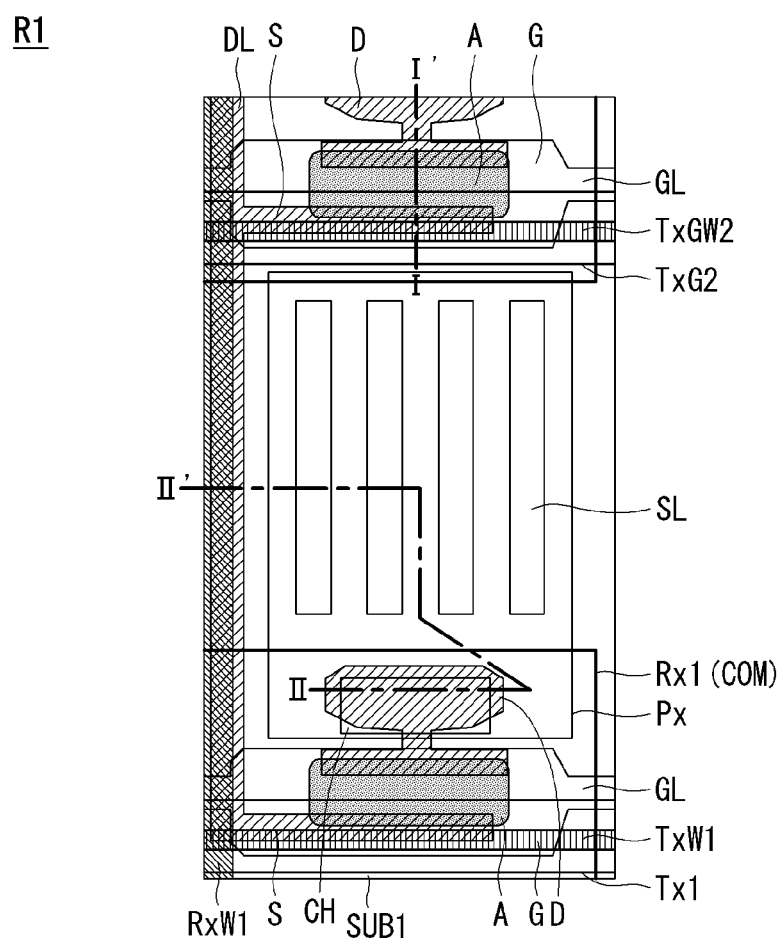
FIG. 4A is a plane view partially showing a touch effective area and a touch non-effective area shown in FIG. 3.
Figure 4B:
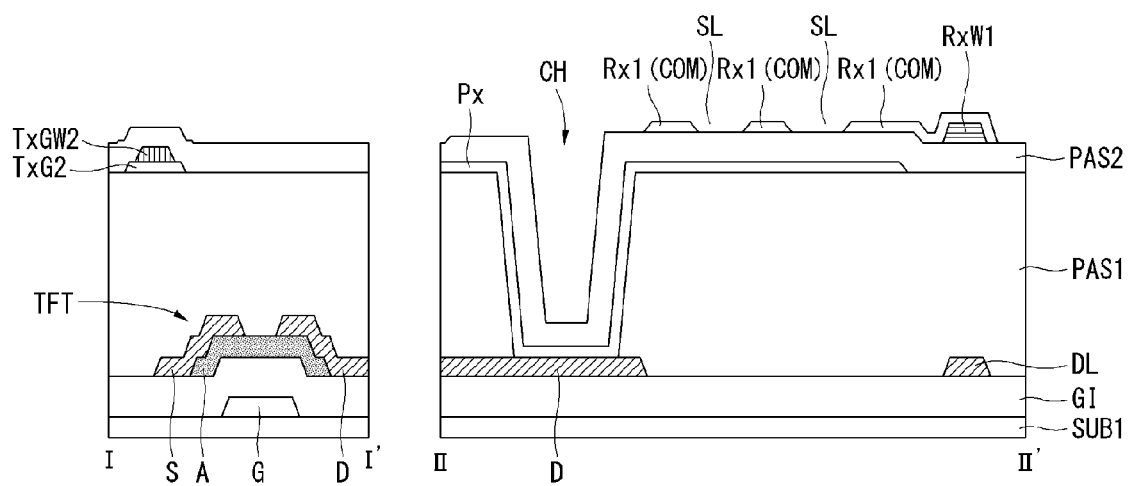
FIG. 4B is a cross-sectional view taken along lines I-I' and II-II' shown in FIG. 4A.

FIG. 3 is a plane view schematically showing an example of a touch effective area formed by touch driving electrodes and touch sensing electrodes in the touch sensor integrated type display device according to the first embodiment of the invention. FIG. 4A is a plane view showing a portion R1 of a touch effective area and a touch non-effective area shown in FIG. 3. FIG. 4B is a cross-sectional view taken along lines I-I' and II-II' shown in FIG. 4A.

As shown in FIGS. 3, 4A, and 4B, the common electrode COM of the touch sensor integrated type display device according to the first embodiment of the invention includes a plurality of common electrodes divided in parallel in the first direction (for example, x-axis direction) or the second direction (for example, y-axis direction). For example, FIG. 3 shows the plurality of common electrodes COM divided in the y-axis direction. The common electrodes COM serve as a plurality of touch sensing electrodes Rx1, Rx2, and Rx3 constituting a touch sensor. Each of the first to third touch sensing electrodes Rx1, Rx2, and Rx3 arranged in the second direction includes a plurality of electrode patterns, and the plurality of electrode patterns are integrally connected to one another by at least one connection portion. In the example of FIG. 3, the neighboring electrode patterns are integrally connected to one another by three connection portions.

The first to third touch sensing electrodes Rx1, Rx2, and Rx3 include touch sensing electrode resistance reducing wires RxW1 to RxW3, RxW4 to RxW6, and RxW7 to RxW9 for reducing resistance of the first to third touch sensing electrodes Rx1, Rx2, and Rx3, respectively. More specifically, the first touch sensing electrode Rx1 contacts the three first touch sensing electrode resistance reducing wires RxW1 to RxW3 arranged along the y-axis direction, and the second touch sensing electrode Rx2 contacts the three second touch sensing electrode resistance reducing wires RxW4 to RxW6 arranged along the y-axis direction. And also the third touch sensing electrode Rx3 contacts the three third touch sensing electrode resistance reducing wires RxW7 to RxW9 arranged along the y-axis direction. The first to third touch sensing electrode resistance reducing wires RxW1 to RxW3, RxW4 to RxW6, and RxW7 to RxW9 are connected to the power supply unit 15 and the touch recognition processor 17 shown in FIG. 1 through first to third sensing routing wires RL1, RL2, and RL3, respectively. The first to third touch sensing electrode resistance reducing wires RxW1 to RxW3, RxW4 to RxW6, and RxW7 to RxW9 are formed of a metal material having a low resistance, for example, Al, AlNd, Mo, MoTi, Cu, Cr, Ag, and Ag-based alloys, so as to reduce the resistances of the first to third touch sensing electrodes Rx1, Rx2, and Rx3 formed of a transparent conductive material such as indium tin oxide (ITO), indium zinc oxide (IZO), and gallium-doped zinc oxide (GZO).

In the touch sensor integrated type display device according to the first embodiment of the invention, the first to third touch sensing electrodes Rx1 to Rx3 receive a common voltage Vcom through the power supply unit 15 shown in FIG. 1 during a display operation, and thus serve as the common electrodes of the display device. Further, during a touch operation, the first to third touch sensing electrodes Rx1 to Rx3 are connected to the touch recognition processor 17 and supply a change amount of mutual capacitance between the touch sensing electrodes and the touch driving electrodes before and after a touch event to the touch recognition processor 17, thereby serving as the touch sensing electrodes, which enable the touch recognition processor 17 to decide whether or not the touch event is generated and a touch position.

The touch sensor integrated type display device according to the first embodiment of the invention includes first to fifth touch non-driving electrodes TxG1 to TxG5 and first to twelfth touch driving electrodes Tx1 to Tx12 which are arranged in the first direction (for example, x-axis direction) so that they cross over the connection portions of the first to third touch sensing electrodes Rx1 to Rx3 and the first to third touch sensing electrode resistance reducing wires RxW1 to RxW3, RxW4 to RxW6, and RxW7 to RxW9. The first to fifth touch non-driving electrodes TxG1 to TxG5 and the first to twelfth touch driving electrodes Tx1 to Tx12 are separated from one another. The first to fifth touch non-driving electrodes TxG1 to TxG5 and the first to twelfth touch driving electrodes Tx1 to Tx12 are alternately disposed at a proper ratio. In the example of FIG. 3, the first to fifth touch non-driving electrodes TxG1 to TxG5 and the first to twelfth touch driving electrodes Tx1 to Tx12 are alternately disposed in such a manner that the two touch non-driving electrodes TxG1 and TxG2 or TxG3 and TxG4 are disposed and then the six touch driving electrodes Tx1 to Tx6 or Tx7 to Tx12 are disposed. However, the embodiment of the invention is not limited thereto. Namely, the disposition order and the disposition number of the driving and non-driving electrodes may be properly changed according to a need.

The first to fifth touch non-driving electrodes TxG1 to TxG5 include first to fifth touch non-driving electrode resistance reducing wires TxGW1 to TxGW5 for reducing resistance of the first to fifth touch non-driving electrodes TxG1 to TxG5, respectively. The first and second touch non-driving electrodes TxG1 and TxG2 are connected to a first ground wire GND1 through the first and second touch non-driving electrode resistance reducing wires TxGW1 and TxGW2. The third and fourth touch non-driving electrodes TxG3 and TxG4 are connected to a second ground wire GND2 through the third and fourth touch non-driving electrode resistance reducing wires TxGW3 and TxGW4. The fifth touch non-driving electrode TxG5 is connected to a third ground wire GND3 through the fifth touch non-driving electrode resistance reducing wire TxGW5. The first to third ground wires GND1 to GND3 are connected to ground.

When the first to twelfth touch driving electrodes Tx1 to Tx12 are formed of a transparent metal material such as ITO, IZO, and GZO, the first to twelfth touch driving electrodes Tx1 to Tx12 include first to twelfth touch driving electrode resistance reducing wires TxW1 to TxW12 formed of a metal material such as Al, AlNd, Mo, MoTi, Cu, Cr, Ag, and Ag-based alloys for reducing resistance of the first to twelfth touch driving electrodes Tx1 to Tx12, respectively. However, if the first to twelfth touch driving electrodes Tx1 to Tx12 are formed of the metal material such as Al, AlNd, Mo, MoTi, Cu, Cr, Ag, and Ag-based alloys, the first to twelfth touch driving electrode resistance reducing wires do not need to be formed. The first to third touch driving electrodes Tx1 to Tx3 are connected to a first driving routing wire TL1 through the first to third touch driving electrode resistance reducing wires TxW1 to TxW3. The fourth to sixth touch driving electrodes Tx4 to Tx6 are connected to a second driving routing wire TL2 through the fourth to sixth touch driving electrode resistance reducing wires TxW4 to TxW6. The seventh to ninth touch driving electrodes Tx7 to Tx9 are connected to a third driving routing wire TL3 through the seventh to ninth touch driving electrode resistance reducing wires TxW7 to TxW9. The tenth to twelfth touch driving electrodes Tx10 to Tx12 are connected to a fourth driving routing wire TL4 through the tenth to twelfth touch driving electrode resistance reducing wires TxW10 to TxW12.

In the touch sensor integrated type display device according to the first embodiment of the invention, the first to third touch driving electrodes Tx1 to Tx3, the fourth to sixth touch driving electrodes Tx4 to Tx6, the seventh to ninth touch driving electrodes Tx7 to Tx9, and the tenth to twelfth touch driving electrodes Tx10 to Tx12 are connected to the power supply unit 15 shown in FIG. 1 through the first to fourth driving routing wires TL1 to TL4 during the touch operation, and receive a touch driving voltage Vtsp from the power supply unit 15, thereby causing the mutual capacitance to be generated between the touch driving electrodes and the touch sensing electrodes.

On the other hand, because the first and second touch non-driving electrodes TxG1 and TxG2 are connected to the first ground wire GND1 through the first and second touch non-driving electrode resistance reducing wires TxGW1 and TxGW2, the third and fourth touch non-driving electrodes TxG3 and TxG4 are connected to the second ground wire GND2 through the third and fourth touch non-driving electrode resistance reducing wires TxGW3 and TxGW4, and the fifth touch non-driving electrode TxG5 is connected to the third ground wire GND3 through the fifth touch non-driving electrode resistance reducing wire TxGW5 are connected to ground through the ground wires GND1 to GND3, the first to fifth touch non-driving electrodes TxG1 to TxG5 do not serve as the touch sensors.

In the first embodiment of FIG. 3, an area occupied by the first and second touch non-driving electrodes TxG1 and TxG2, an area between the first and second touch non-driving electrodes TxG1 and TxG2, an area occupied by the third and fourth touch non-driving electrodes TxG3 and TxG4, an area between the third and fourth touch non-driving electrodes TxG3 and TxG4, and an area occupied by the fifth touch non-driving electrode TxG5 are touch non-effective areas, and only areas between the adjacent touch non-effective areas are touch effective areas. FIG. 3 shows a touch effective area including a first touch effective area TEA1 and a second touch effective area TEA2 as an example.

In the first embodiment of FIG. 3, a predetermined number of touch non-driving and touch sensing electrodes are present in the touch non-effective area, and the touch non-driving electrodes present in the touch non-effective area are connected to ground. Therefore, the touch driving voltage Vtsp is supplied thereto. Hence, the mutual capacitance is not generated between the touch non-driving electrodes and the touch sensing electrodes present in the touch non-effective area. As a result, some of the touch non-driving electrodes and some of the touch sensing electrodes are not used as effective electrodes for the touch sensing. However, the size of the touch non-effective area is much less than the size of the touch effective area where the touch event is really generated, and the touch effective area is formed directly adjacent to the touch non-effective area. Therefore, although the touch non-effective area is present, it does not matter to the real touch recognition.

In the first embodiment of the invention illustrated in FIG. 3, the touch sensing electrodes (i.e., the common electrodes) may correspond to the pixel electrodes of the display device, respectively. Alternatively, one touch sensing electrode may correspond to several to several tens of pixel electrodes of the display device.

In general, if all of the touch driving electrodes and the touch sensing electrodes are used as the effective electrodes, the touch driving electrodes and the touch sensing electrodes may be adjacent to each other at a very short distance therebetween, and also the number of crossings between the touch driving electrodes and the touch sensing electrodes may increase. In a general capacitive touch sensor, a unit touch effective block (i.e., a base unit for recognizing the touch operation) is configured so that it corresponds to several tens to several hundreds of pixel electrodes. Therefore, the mutual capacitance generated between the touch driving electrodes and the touch sensing electrodes in the touch sensor integrated type display device according to the first embodiment of the invention is several tens of times larger than the general capacitive touch sensor. A sharp increase in the mutual capacitance in the first embodiment of the invention may reduce the touch sensitivity and may increase a parasitic capacitance, thereby reducing a touch performance.

However, in the touch sensor integrated type display device according to the first embodiment of the invention illustrated in FIG. 3, as described above, the number of touch driving electrodes and the number of touch sensing electrodes used as the touch effective electrode may decrease by connecting the touch non-driving electrodes to the ground. Thus, the mutual capacitance between the touch driving electrodes and the touch sensing electrodes may be reduced. Hence, a reduction in the touch sensitivity and an increase in the parasitic capacitance may be prevented, and the touch performance may be improved.

Furthermore, the touch driving electrodes or the touch sensing electrodes may be appropriately grouped using the driving routing wires and the sensing routing wires. Therefore, a touch recognition unit capable of recognizing the touch operation may be properly adjusted according to a need.

Although FIG. 3 illustrating the first embodiment of the invention concretely shows the number of touch non-driving electrodes, the number of touch non-driving electrode resistance reducing wires, the number of touch driving electrodes, the number of touch driving electrode resistance reducing wires, the number of touch sensing electrodes, and the number of touch sensing electrode resistance reducing wires, it should be understood that they are merely an example. Further, it should be understood that those skilled in the art may properly change the numbers according to a need. This may be equally applied to other embodiments of the invention.

Next, the structure of the touch sensor integrated type display device is described in detail with reference to FIGS. 3, 4A, and 4B.

As shown in FIGS. 3, 4A, and 4B, the touch sensor integrated type display device according to the first embodiment of the invention includes gate lines GL and data lines DL which are formed on the substrate SUB1 of the TFT array TFTA to cross each other, thin film transistors TFT respectively formed at crossings of the gate lines GL and the data lines DL, pixel electrodes Px formed in areas defined by a crossing structure of the gate lines GL and the data lines DL, and common electrodes COM positioned opposite the pixel electrodes Px. In the first embodiment of the invention, the common electrode COM serves as the touch sensing electrode Rx1 as well as the common electrode COM. Therefore, in the following description, the common electrode COM is referred to as the touch sensing electrode Rx1, the touch sensing electrode Rx1 serving as the common electrode, or the common electrode COM serving as the touch sensing electrode according to a need.

As shown in FIGS. 4A and 4B, the thin film transistor TFT includes a gate electrode G extending from the gate line GL, an active layer A which is formed on a gate insulation layer GI covering the gate line GL and the gate electrode G at a location corresponding to the gate electrode G, a source electrode S extending from the data line DL which is formed on a first passivation layer PAS1 covering the active layer A, and a drain electrode D positioned opposite the source electrode S. The thin film transistor TFT is covered by the first passivation layer PAS1, and a portion of the drain electrode D of the thin film transistor TFT is exposed through a contact hole CH formed in the first passivation layer PAS1.

The pixel electrodes Px are formed in pixel areas, on the first passivation layer PAS1, which are defined by the crossing structure of the gate lines GL and the data lines DL. A touch non-driving electrode TxG2 and a touch driving electrode Tx1 are formed between the pixel electrodes Px, which are positioned adjacent to each other with the gate line GL interposed therebetween, in parallel with the gate line GL. At least a portion of each of the touch non-driving electrode TxG2 and the touch driving electrode Tx1 may overlap or may not overlap the gate line GL. Each pixel electrode Px is connected to the drain electrode D of the thin film transistor TFT exposed through the first passivation layer PAS1.

A touch non-driving electrode resistance reducing wire TxGW2 is formed on the touch non-driving electrode TxG2 of the touch non-effective area, and a touch driving electrode resistance reducing wire TxW1 is formed on the touch driving electrode Tx1 of the touch effective area TEA1. The touch non-driving electrodes and the touch driving electrodes are connected to the ground wires and the first to fourth driving routing wires TL1 to TL4 at a predetermined number, respectively using the touch non-driving electrode resistance reducing wires and the touch driving electrode resistance reducing wires, and thus may be easily grouped.

A second passivation layer PAS2 is formed on the entire surface of the substrate SUB1, on which the touch non-driving electrode TxG2, the touch non-driving electrode resistance reducing wire TxGW2, the touch driving electrode Tx1, the touch driving electrode resistance reducing wire TxW1, and the pixel electrodes Px are formed. A touch sensing electrode resistance reducing wire RxW1 is formed on the second passivation layer PAS2 in parallel with the data line DL.

A touch sensing electrode Rx1 serving as the common electrode is formed on the second passivation layer PAS2, on which the touch sensing electrode resistance reducing wire RxW1 is formed, in the y-axis direction, so that the touch sensing electrode Rx1 overlaps the pixel electrode Px and contacts the touch sensing electrode resistance reducing wire RxW1. In the first embodiment of the invention, the touch sensing electrodes Rx1, Rx2, and Rx3 serving as the common electrode overlap the pixel electrode Px and are connected to one another in an arrangement direction of the data line DL, thereby forming one sensing electrode line as shown in FIG. 3. Further, each of the touch sensing electrodes Rx1, Rx2, and Rx3 serving as the common electrode may has a plurality of slits SL.

In the touch sensor integrated type display device according to the first embodiment of the invention, as shown in FIGS. 4A and 4B, the pixel electrode Px formed on the first passivation layer PAS1 has no slit, and the touch sensing electrode Rx1 serving as the common electrode formed on the second passivation layer PAS2 has the slits SL.

Next, another example (modified example) of the touch recognition area formed by the touch driving electrode and the touch sensing electrode in the touch sensor integrated type display device according to the first embodiment of the invention is described with reference to FIG. 5.

A difference between the modified example illustrated in FIG. 5 and the first embodiment illustrated in FIG. 3 is as follows. In the first embodiment illustrated in FIG. 3, only the touch non-driving electrodes TxG1-TxG2, TxG3-TxG4, and TxG5 are respectively connected to the ground wires GND1, GND2, and GND3 through the touch non-driving electrode resistance reducing wires TxGW1-TxGW2, TxGW3-TxGW4, and TxGW5, respectively. On the other hand, in the modified example illustrated in FIG. 5, touch non-sensing electrodes as well as the touch non-driving electrodes are connected to ground through the ground wires.

Figure 5:
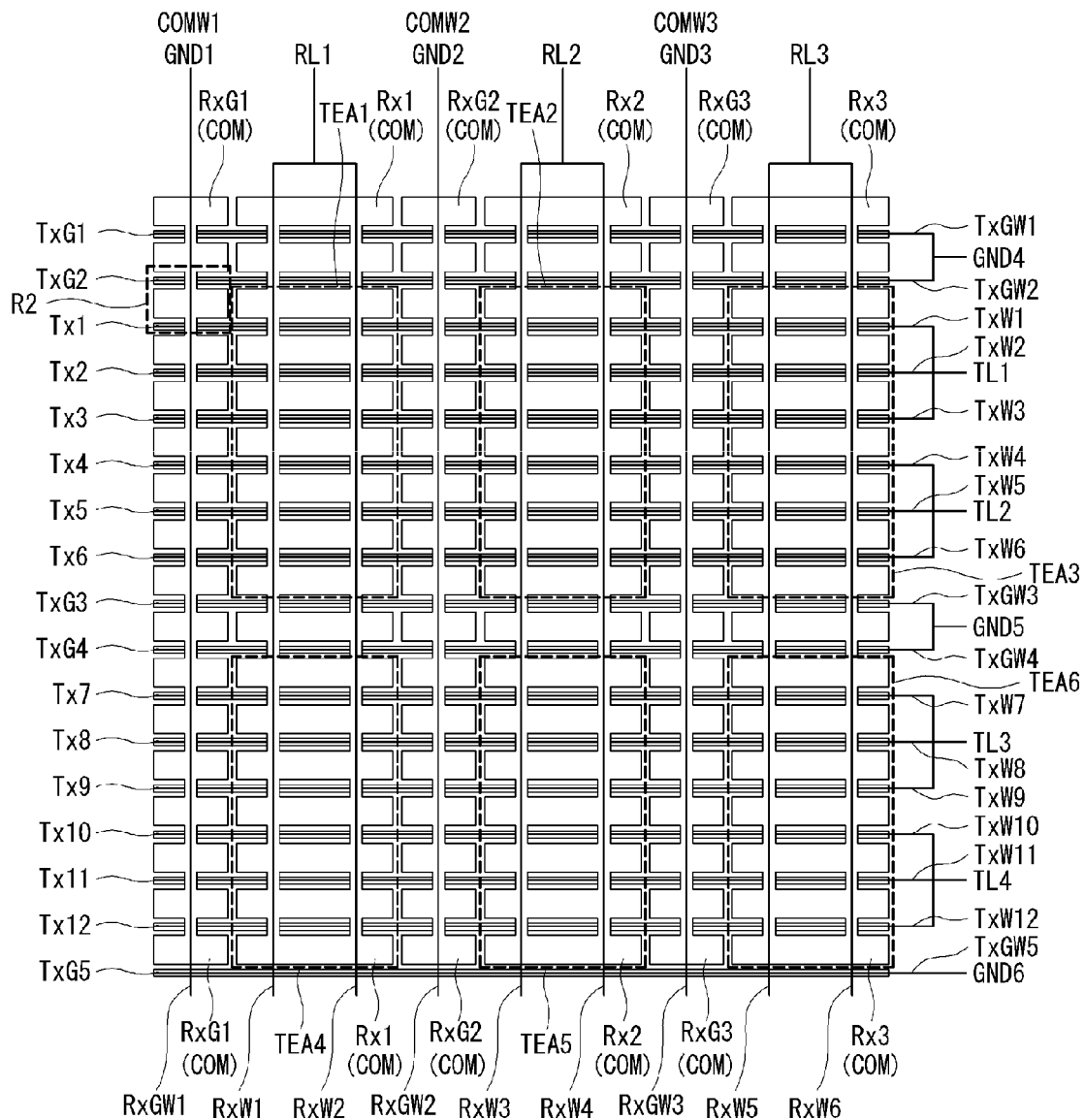
FIG. 5 is a plane view schematically showing another example of a touch effective area formed by touch driving electrodes and touch sensing electrodes in the touch sensor integrated type display device according to the first embodiment of the invention.
Figure 6A:
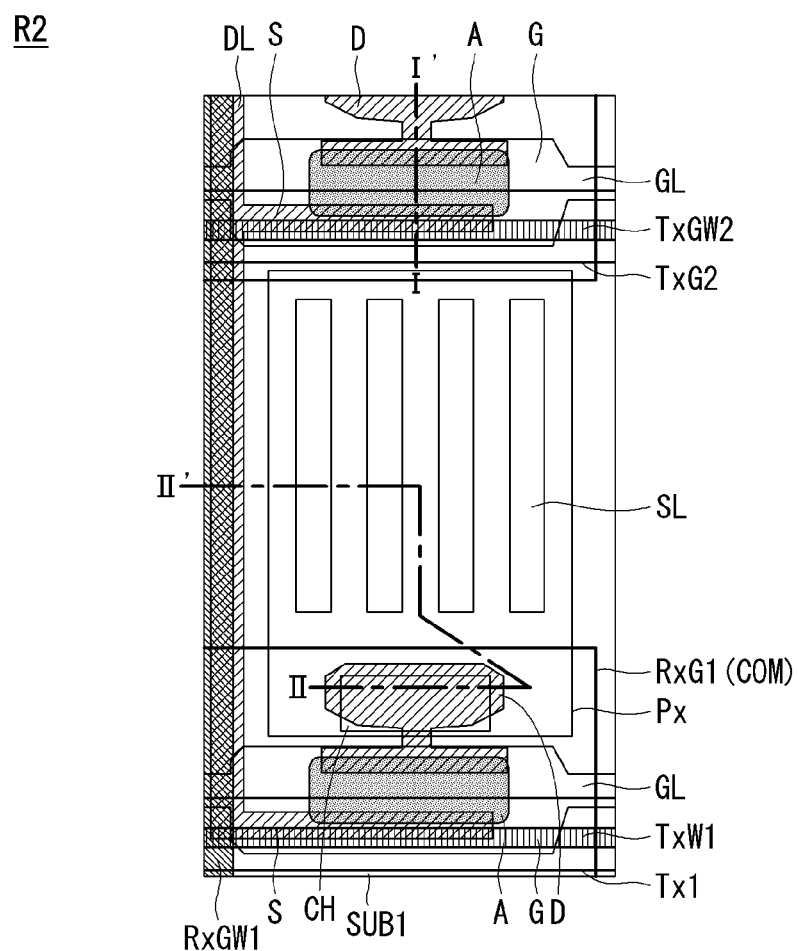
FIG. 6A is a plane view partially showing a touch effective area and a touch non-effective area shown in FIG. 5.
Figure 6B:
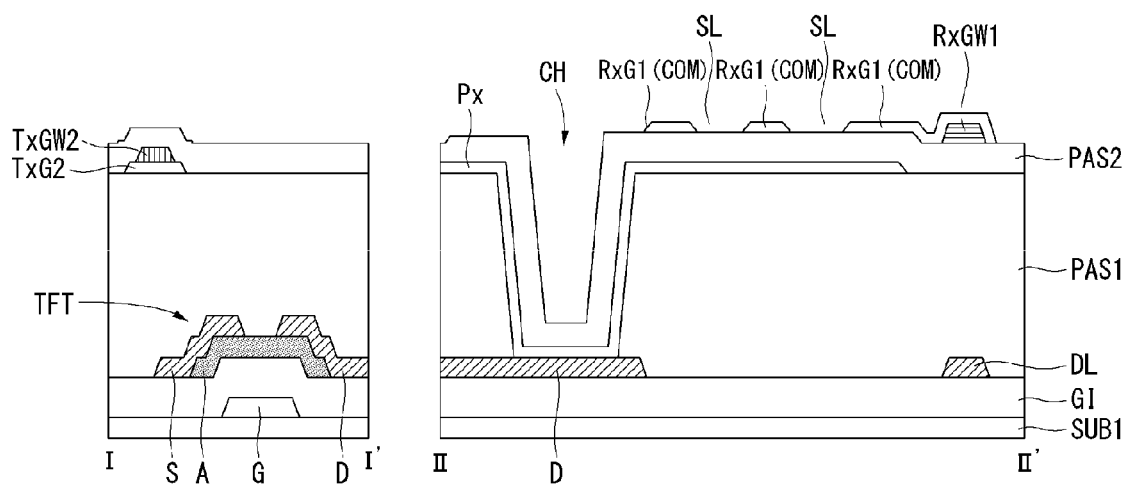
FIG. 6B is a cross-sectional view taken along lines I-I' and II-II' shown in FIG. 6A.

As shown in FIGS. 5, 6A and 6B, a common electrode COM of the touch sensor integrated type display device according to the modified example of the first embodiment of the invention includes a plurality of common electrodes divided in the first direction (for example, x-axis direction) or the second direction (for example, y-axis direction). For example, FIG. 5 shows the common electrodes COM divided in the y-axis direction. Some of the plurality of common electrodes COM serve as touch sensing electrodes Rx1, Rx2, and Rx3, and the others of the plurality of common electrodes COM serve as touch non-sensing electrodes RxG1, RxG2, and RxG3.

Each of the first to third touch sensing electrodes Rx1, Rx2, and Rx3 arranged in the second direction (for example, y-axis direction) includes a plurality of electrode patterns, and the plurality of electrode patterns are integrally connected to one another by at least one connection portion. In the modified example of FIG. 5, the neighboring electrode patterns are integrally connected to one another by two connection portions as an example.

The first to third touch sensing electrodes Rx1, Rx2, and Rx3 include first to third touch sensing electrode resistance reducing wires RxW1-RxW2, RxW3-RxW4, and RxW5-RxW6 for reducing resistance of the first to third touch sensing electrodes Rx1, Rx2, and Rx3, respectively. More specifically, the first touch sensing electrode Rx1 contacts the two first touch sensing electrode resistance reducing wires RxW1 and RxW2, the second touch sensing electrode Rx2 contacts the two second touch sensing electrode resistance reducing wires RxW3 and RxW4, and the third touch sensing electrode Rx3 contacts the two third touch sensing electrode resistance reducing wires RxW5 and RxW6. The first to third touch sensing electrode resistance reducing wires RxW1-RxW2, RxW3-RxW4, and RxW5-RxW6 are connected to the power supply unit 15 and the touch recognition processor 17 through first to third sensing routing wires RL1, RL2, and RL3, respectively.

The first to third touch non-sensing electrodes RxG1 to RxG3 arranged in the y-axis direction and the first to third touch sensing electrodes Rx1, Rx2, and Rx3 arranged in the y-axis direction are alternately disposed. In the modified example of the first embodiment illustrated in FIG. 5, the first to third touch non-sensing electrodes RxG1 to RxG3 and the first to third touch sensing electrodes Rx1, Rx2, and Rx3 are alternately disposed, and their sizes are different from each other. However, the embodiment of the invention is not limited thereto. Namely, the sizes of the electrodes, the number of touch sensing electrodes and the number of touch non-sensing electrodes connected to the routing wires or the ground wires, etc. may be properly changed according to a need.

The first to third touch non-sensing electrodes RxG1 to RxG3 include first to third touch non-sensing electrode resistance reducing wires for reducing resistance of the first to third touch non-sensing electrodes RxG1 to RxG3, respectively. More specifically, the first touch non-sensing electrode RxG1 contacts a first touch non-sensing electrode resistance reducing wire RxGW1, the second touch non-sensing electrode RxG2 contacts a second touch non-sensing electrode resistance reducing wire RxGW2, and the third touch non-sensing electrode RxG3 contacts a third touch non-sensing electrode resistance reducing wire RxGW3. The first to third touch non-sensing electrode resistance reducing wires RxGW1, RxGW2, and RxGW3 are connected to ground through first to third ground wires GND1, GND2, and GND3, respectively.

The modified example of the first embodiment shows that the first to third touch non-sensing electrodes RxG1 to RxG3 respectively connected to the first to third ground wires GND1 to GND3 through the first to third touch non-sensing electrode resistance reducing wires RxGW1 to RxGW3 are arranged in a line. However, the embodiment of the invention is not limited thereto. For example, the touch non-sensing electrodes arranged in two or more lines may be connected to the ground wires, respectively.

In the touch sensor integrated type display device according to the modified example of the first embodiment of the invention, the first to third touch sensing electrodes Rx1 to Rx3 receive a common voltage Vcom through the power supply unit 15 shown in FIG. 1 during the display operation. Further, during the touch operation, the first to third touch sensing electrodes Rx1 to Rx3 are connected to the touch recognition processor 17 and supply a change amount of mutual capacitance between the touch sensing electrodes and the touch driving electrodes before and after a touch event to the touch recognition processor 17. Hence, the first to third touch sensing electrodes Rx1 to Rx3 enable the touch recognition processor 17 to decide whether or not the touch event is generated and a touch position. However, the first to third touch non-sensing electrodes RxG1 to RxG3 receive the common voltage Vcom from the power supply unit 15 through first to third common wires COMW1, COMW2, and COMW3 during the display operation. On the other hand, the first to third touch non-sensing electrodes RxG1 to RxG3 are connected to the ground through the first to third ground wires GND1 to GND3 during the touch operation. In the modified example illustrated in FIG. 5, the first to third common wires COMW1 to COMW3 and the first to third ground wires GND1 to GND3 are similar to those of the first embodiment. Namely, the wires may selectively perform the supply of the common voltage and the connection of the ground using the switching elements during the display operation and touch operation. It is a matter of course that the first to third common wires COMW1 to COMW3 and the first to third ground wires GND1 to GND3 may be separately formed. Namely, the first to third touch non-sensing electrodes RxG1 to RxG3 may be connected to the power supply unit 15 through the first to third common wires COMW1 to COMW3 during the display operation. The first to third touch non-sensing electrodes RxG1 to RxG3 may be connected to the ground through the first to third ground wires GND1 to GND3 during the touch operation. As described above, because the first to third touch non-sensing electrodes RxG1 to RxG3 connected to the first to third ground wires GND1 to GND3 are connected to the ground through the first to third ground wires GND1 to GND3, the first to third touch non-sensing electrodes RxG1 to RxG3 do not serve as the touch sensor during the touch operation.

The touch sensor integrated type display device according to the modified example of the first embodiment of the invention includes first to fifth touch non-driving electrodes TxG1 to TxG5 and first to twelfth touch driving electrodes Tx1 to Tx12 which are arranged in the first direction (for example, x-axis direction) so that they cross over connection portions of the first to third touch non-sensing electrodes RxG1 to RxG3, the touch non-sensing electrode resistance reducing wires RxGW1 to RxGW3, connection portions of the first to third touch sensing electrodes Rx1 to Rx3, and the touch sensing electrode resistance reducing wires RxW1 to RxW3. The first to fifth touch non-driving electrodes TxG1 to TxG5 and first to twelfth touch driving electrodes Tx1 to Tx12 are separated from one another. The first to fifth touch non-driving electrodes TxG1 to TxG5 and the first to twelfth touch driving electrodes Tx1 to Tx12 are alternately disposed at a proper ratio. In the modified example of FIG. 5, the first to fifth touch non-driving electrodes TxG1 to TxG5 and the first to twelfth touch driving electrodes Tx1 to Tx12 are alternately disposed in such a manner that the two touch non-driving electrodes TxG1 and TxG2 or TxG3 and TxG4 are disposed and then the six touch driving electrodes Tx1 to Tx6 or Tx7 to Tx12 are disposed. However, the embodiment of the invention is not limited thereto. Namely, the disposition order and the disposition number of electrodes may be properly changed according to a need.

The first to fifth touch non-driving electrodes TxG1 to TxG5 include first to fifth touch non-driving electrode resistance reducing wires TxGW1 to TxGW5 for reducing resistance of the first to fifth touch non-driving electrodes TxG1 to TxG5, respectively. The first and second touch non-driving electrodes TxG1 and TxG2 are connected to the first ground wire GND1 through the first and second touch non-driving electrode resistance reducing wires TxGW1 and TxGW2. The third and fourth touch non-driving electrodes TxG3 and TxG4 are connected to the second ground wire GND2 through the third and fourth touch non-driving electrode resistance reducing wires TxGW3 and TxGW4. The fifth touch non-driving electrode TxG5 is connected to the third ground wire GND3 through the fifth touch non-driving electrode resistance reducing wire TxGW5. The first to third ground wires GND1 to GND3 are connected to ground.

When the first to twelfth touch driving electrodes Tx1 to Tx12 are formed of a transparent metal material such as ITO, IZO, and GZO, the first to twelfth touch driving electrodes Tx1 to Tx12 include first to twelfth touch driving electrode resistance reducing wires TxW1 to TxW12 formed of a metal material such as Al, AlNd, Mo, MoTi, Cu, Cr, Ag, and Ag-based alloys for reducing resistance of the first to twelfth touch driving electrodes Tx1 to Tx12, respectively. However, if the first to twelfth touch driving electrodes Tx1 to Tx12 are formed of the metal material such as Al, AlNd, Mo, MoTi, Cu, Cr, Ag, and Ag-based alloys, the touch driving electrode resistance reducing wires do not need to be formed. The first to third touch driving electrodes Tx1 to Tx3 are connected to a first driving routing wire TL1 through the first to third touch driving electrode resistance reducing wires TxW1 to TxW3. The fourth to sixth touch driving electrodes Tx4 to Tx6 are connected to a second driving routing wire TL2 through the fourth to sixth touch driving electrode resistance reducing wires TxW4 to TxW6. The seventh to ninth touch driving electrodes Tx7 to Tx9 are connected to a third driving routing wire TL3 through the seventh to ninth touch driving electrode resistance reducing wires TxW7 to TxW9. The tenth to twelfth touch driving electrodes Tx10 to Tx12 are connected to a fourth driving routing wire TL4 through the tenth to twelfth touch driving electrode resistance reducing wires TxW10 to TxW12.

In the touch sensor integrated type display device according to the modified example of the first embodiment of the invention, the first to third touch driving electrodes Tx1 to Tx3, the fourth to sixth touch driving electrodes Tx4 to Tx6, the seventh to ninth touch driving electrodes Tx7 to Tx9, and the tenth to twelfth touch driving electrodes Tx10 to Tx12 are respectively connected to the power supply unit 15 shown in FIG. 1 through the first to fourth driving routing wires TL1 to TL4 during the touch operation, and receive a touch driving voltage Vtsp from the power supply unit 15, thereby causing the mutual capacitance to be generated between the touch driving electrodes and the touch sensing electrodes.

On the other hand, because the first and second touch non-driving electrodes TxG1 and TxG2 are connected to a fourth ground wire GND4 through the first and second touch non-driving electrode resistance reducing wires TxGW1 and TxGW2, the third and fourth touch non-driving electrodes TxG3 and TxG4 are connected to a fifth ground wire GND5 through the third and fourth touch non-driving electrode resistance reducing wires TxGW3 and TxGW4, and the fifth touch non-driving electrode TxG5 is connected to a sixth ground wire GND6 through the fifth touch non-driving electrode resistance reducing wire TxGW5 are connected to the ground through the fourth to sixth ground wires GND4 to GND6, the first to fifth touch non-driving electrodes TxG1 to TxG5 do not serve as the touch sensors.

In the modified example of the first embodiment illustrated in FIG. 5, an area occupied by the first to third touch non-sensing electrodes RxG1 to RxG3, an area occupied by the first and second touch non-driving electrodes TxG1 and TxG2, an area between the first and second touch non-driving electrodes TxG1 and TxG2, an area occupied by the third and fourth touch non-driving electrodes TxG3 and TxG4, an area between the third and fourth touch non-driving electrodes TxG3 and TxG4, and an area occupied by the fifth touch non-driving electrode TxG5 are touch non-effective areas, and remaining areas except the touch non-effective areas are touch effective areas. FIG. 5 shows a touch effective area including first to sixth touch effective areas TEA1 to TEA6 as an example.

In the modified example of the first embodiment illustrated in FIG. 5, a predetermined number of touch non-driving and touch non-sensing electrodes are present in the touch non-effective area, and the touch non-driving electrodes and the touch non-sensing electrodes present in the touch non-effective area are connected to ground. Hence, the mutual capacitance is not generated between the touch non-driving electrodes and the touch non-sensing electrodes present in the touch non-effective area. As a result, some of the touch non-driving electrodes and some of the touch non-sensing electrodes are not used as effective electrodes for the touch sensing. However, in the same manner as the first embodiment, the size of the touch non-effective area is much less than the size of the touch effective area where the touch event is really generated, and the touch effective area is formed directly adjacent to the touch non-effective area. Therefore, although the touch non-effective area is present, it does not matter to the real touch recognition.

In the modified example of the first embodiment of the invention illustrated in FIG. 5, the touch sensing electrodes (i.e., the common electrodes) may correspond to the pixel electrodes of the display device, respectively. Alternatively, one touch sensing electrode may correspond to several to several tens of pixel electrodes of the display device.

In general, if all of the touch driving electrodes and the touch sensing electrodes are used as the effective electrodes, the touch driving electrodes and the touch sensing electrodes may be adjacent to each other at a very short distance therebetween, and also the number of crossings between the touch driving electrodes and the touch sensing electrodes may increase. In a general capacitive touch sensor, a unit touch effective block (i.e., a base unit for recognizing the touch operation) is configured so that it corresponds to several tens to several hundreds of pixel electrodes. Therefore, the mutual capacitance generated between the touch driving electrodes and the touch sensing electrodes in the touch sensor integrated type display device according to the modified example of the first embodiment of the invention is several tens of times larger than the general capacitive touch sensor. A sharp increase in the mutual capacitance in the modified example may reduce the touch sensitivity and may increase a parasitic capacitance, thereby reducing a touch performance.

However, in the touch sensor integrated type display device according to the modified example of the first embodiment of the invention illustrated in FIG. 5, as described above, the number of touch driving electrodes and the number of touch sensing electrodes used as the touch effective electrode may further decrease compared to the first embodiment by connecting the touch non-driving electrodes and the touch non-sensing electrodes to the ground. Thus, the mutual capacitance between the touch driving electrodes and the touch sensing electrodes may be reduced. Hence, a reduction in the touch sensitivity and an increase in the parasitic capacitance may be prevented, and the touch performance may be further improved.

In the modified example of the first embodiment, the touch driving electrodes or the touch sensing electrodes may be appropriately grouped using the driving routing wires and the sensing routing wires in the same manner as the first embodiment. Therefore, a touch recognition unit capable of recognizing the touch operation may be properly adjusted according to a need.

Although FIG. 5 illustrating the modified example of the first embodiment of the invention concretely shows the number of touch non-driving electrodes, the number of touch non-driving electrode resistance reducing wires, the number of touch sensing electrodes, the number of touch sensing electrode resistance reducing wires, the number of touch non-sensing electrodes, and the number of touch non-sensing electrode resistance reducing wires, it should be understood that they are merely an example. Further, it should be understood that those skilled in the art may properly change the numbers according to a need. This may be equally applied to other embodiments of the invention. Since the structure of the touch sensor integrated type display device according to the modified example of the first embodiment illustrated in FIG. 5 is substantially the same as the first embodiment illustrated in FIG. 3 except that the first to third touch non-sensing electrodes RxG1 to RxG3 are respectively connected to the first to third ground wires GND1 to GND3 or the first to third common wires COMW1 to COMW3, a further description may be briefly made or may be entirely omitted.

Referring again to FIGS. 1, 3 and 5, the gate driver 13 sequentially outputs a gate pulse (or a scan pulse) under the control of the timing controller 11 in a display mode. The gate driver 13 shifts a swing voltage of the gate pulse to a gate high voltage VGH and a gate low voltage VGL. The gate pulse output from the gate driver 13 is synchronized with the data voltage output from the data driver 12 and is sequentially supplied to the gate lines G1 to Gm. The gate high voltage VGH is equal to or greater than a threshold voltage of the thin film transistor TFT, and the gate low voltage VGL is less than the threshold voltage of the thin film transistor TFT. A plurality of gate driving integrated circuits (ICs) of the gate driver 13 may be connected to the gate lines G1 to Gm formed on the first substrate SUBS1 of the TFT array TFTA through a tape automated bonding (TAB) process. Alternatively, the gate driving ICs of the gate driver 13 may be directly formed on the first substrate SUBS1 of the TFT array TFTA along with pixels through a gate-in-panel (GIP) process.

The data driver 12 samples and latches digital video data RGB under the control of the timing controller 11. The data driver 12 inverts a polarity of the data voltage of the digital video data RGB based on positive and negative gamma compensation voltages GMA1 to GMAn supplied from the power supply unit 15 and outputs the positive and negative data voltages. The positive and negative data voltages output from the data driver 12 are synchronized with the gate pulses output from the gate driver 13. A plurality of source driving ICs of the data driver 12 may be connected to the data lines D1 to Dn formed on the first substrate SUBS1 of the TFT array TFTA through a chip-on glass (COG) process or the TAB process. The source driving ICs may be integrated inside the timing controller 11 and thus may be implemented as one chip IC along with the timing controller 11.

The timing controller 11 generates timing control signals for controlling operation timings of the gate driver 13 and the data driver 12 using timing signals Vsync, Hsync, DE, and MCLK, which are received from the external host controller 10 and are used to drive the touch sensor integrated type display device. The timing control signals include a gate timing control signal for controlling the operation timing of the gate driver 13 and a data timing control signal for controlling the operation timing of the data driver 12 and the polarity of the data voltage.

The gate timing control signal includes a gate start pulse GSP, a gate shift clock GSC, a gate output enable signal GOE, and the like. The gate start pulse GSP is applied to a first gate driving IC of the gate driver 13, which will output a first gate pulse in each frame period, and controls a shift start timing of the first gate driving IC. The gate shift clock GSC is commonly input to the gate driving ICs of the gate driver 13 and also shifts the gate start pulse GSP. The gate output enable signal GOE controls output timings of the gate driving ICs of the gate driver 13.

The data timing control signal includes a source start pulse SSP, a source sampling clock SSC, a polarity control signal POL, a source output enable signal SOE, and the like. The source start pulse SSP is applied to a first source driving IC of the data driver 12 to firstly sample the data and controls a data sampling start timing. The source sampling clock SSC controls a sampling timing of data inside the source driving ICs based on a rising or falling edge thereof. The polarity control signal POL controls the polarity of the data voltage output from the source driving ICs. The source output enable signal SOE controls output timings of the source driving ICs. If the digital video data RGB is input to the data driver 12 through a mini low voltage differential signaling (LVDS) interface, the source start pulse SSP and the source sampling clock SSC may be omitted.

The power supply unit 15 is implemented as a DC-DC converter including a pulse width modulation (PWM) circuit, a boost converter, a regulator, a charge pump, a voltage divider, an operational amplifier, etc. The power supply unit 15 regulates a voltage input from the host controller 10 and generates voltages required to drive the liquid crystal display panel LCP, the data driver 12, the gate driver 13, the timing controller 11, and the backlight unit (not shown).

The voltages generated by the power supply unit 15 include a high potential power voltage VDD, the gate high voltage VGH, the gate low voltage VGL, the common voltage Vcom, positive and negative gamma reference voltages VGMA1 to VGMAn, the touch driving voltage Vtsp, and the like. The common voltage Vcom is supplied to all of the common electrodes COM under the control of the host controller 10 during the display operation. Alternatively, the common voltage Vcom may be supplied to all of the common electrodes COM under the control of the timing controller 11 during the display operation. The touch driving voltage Vtsp is supplied to the touch driving electrodes Tx1-Tx3, Tx4-Tx6, Tx7-Tx9, and Tx10-Tx12 under the control of the host controller 10 during the touch operation. Alternatively, the touch driving voltage Vtsp may be supplied to the touch driving electrodes Tx1-Tx3, Tx4-Tx6, Tx7-Tx9, and Tx10-Tx12 under the control of the timing controller 11 during the touch operation. The first embodiment of the invention shown in FIG. 1 describes that the touch driving voltage Vtsp is supplied to the touch driving electrodes Tx1-Tx3, Tx4-Tx6, Tx7-Tx9, and Tx10-Tx12 through the power supply unit 15, but is not limited thereto. For example, the touch driving voltage Vtsp may be supplied to the touch driving electrodes Tx1-Tx3, Tx4-Tx6, Tx7-Tx9, and Tx10-Tx12 through the touch recognition processor 17 controlled by the host controller 10 or the timing controller 11.

The host controller 10 transfers the digital video data RGB of an input image and the timing signals Vsync, Hsync, DE, and MCLK required to perform the display driving operation to the timing controller 11 through an interface, such as a low voltage difference signaling (LVDS) interface and a transition minimized differential signaling (TMDS) interface. During the display driving operation for displaying the image on the screen of the touch sensor integrated type liquid crystal display, the host controller 10 supplies a control signal Vin to the power supply unit 15, so that the plurality of common electrodes COM may receive the common voltage Vcom of the same voltage level. Further, during the touch driving operation for the touch recognition, the host controller 10 supplies the control signal Vin to the power supply unit 15, so that the touch driving voltage Vtsp may be supplied to the touch driving electrodes Tx1-Tx3, Tx4-Tx6, Tx7-Tx9, and Tx10-Tx12.

The touch recognition processor 17 differentially amplifies a voltage of an initial capacitance of each of the touch sensing electrodes Rx1, Rx2, and Rx3 before a touch event and a voltage of a touch capacitance of each of the touch sensing electrodes Rx1, Rx2, and Rx3 after the touch event. The touch recognition processor 17 then converts a result of the differential amplification into digital data. The touch recognition processor 17 decides a touch position based on a difference between the initial capacitance and the touch capacitance of each of the touch sensing electrodes Rx1, Rx2, and Rx3 using a touch recognition algorithm and outputs touch coordinate data indicating the touch position to the host controller 10.

As described above, the first to third touch sensing electrodes Rx1, Rx2, and Rx3 according to the first embodiment of the invention form touch sensing lines in the y-axis direction, and the touch driving electrodes Tx1-Tx3, Tx4-Tx6, Tx7-Tx9, and Tx10-Tx12 form touch driving lines in the x-axis direction. Hence, they have a crossing configuration. Accordingly, if a touch event is generated on the touch sensor integrated type liquid crystal display, there may be a variation of the mutual capacitance between the touch driving lines and the touch sensing lines. It is possible to detect the touch position by measuring the variation of the mutual capacitance.

Next, a touch sensor integrated type display device according to a second embodiment of the invention is described in detail with reference to FIG. 7.

Figure 7:
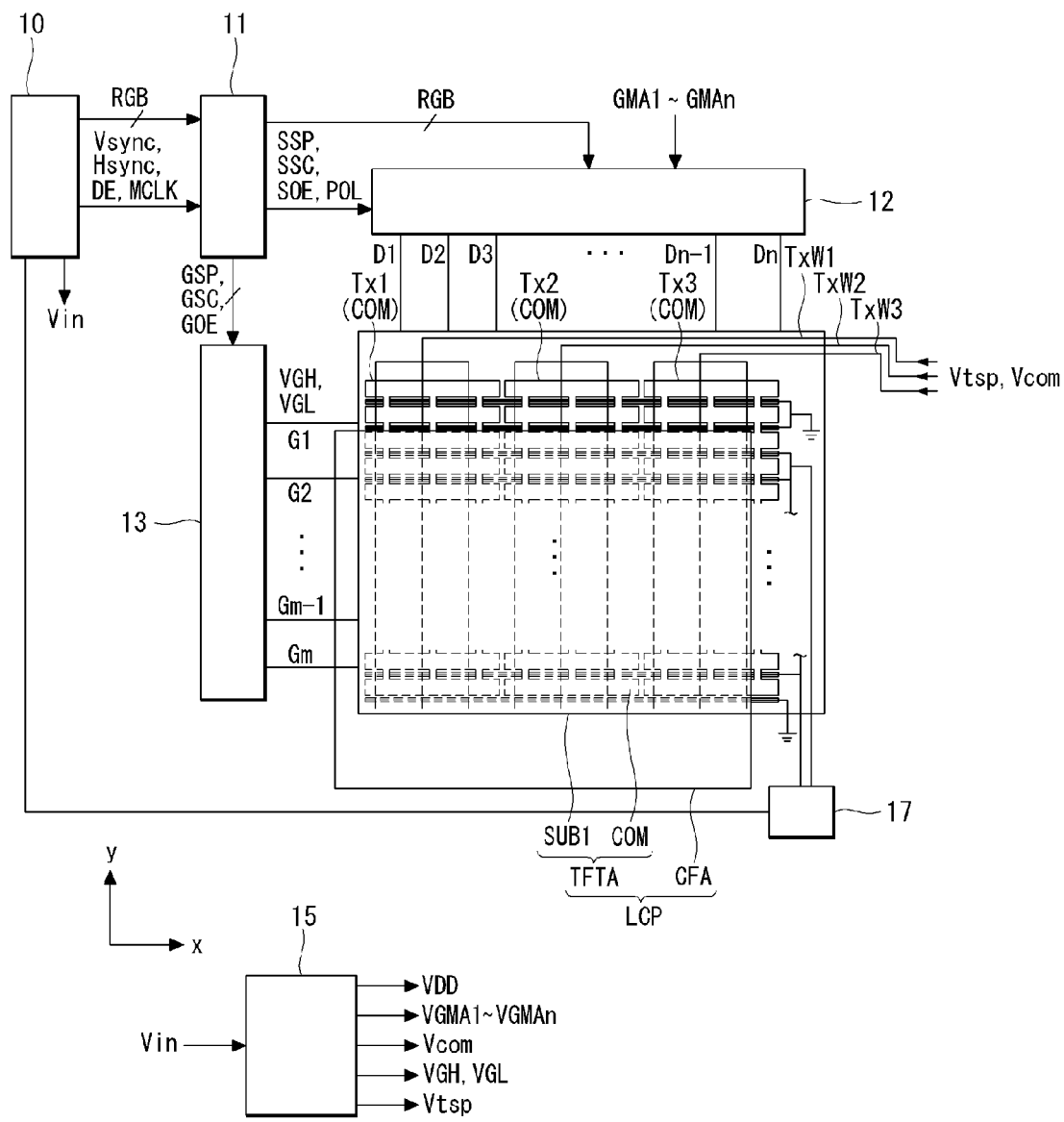
FIG. 7 is a block diagram schematically showing a touch sensor integrated type display device according to a second embodiment of the invention.

As shown in FIG. 7, a touch sensor integrated type liquid crystal display according to the second embodiment of the invention includes a liquid crystal display panel LCP, a host controller 10, a timing controller 11, a data driver 12, a gate driver 13, a power supply unit 15, and a touch recognition processor 17.

Since configuration of the liquid crystal display panel LCP of the touch sensor integrated type liquid crystal display according to the second embodiment of the invention is substantially the same as configuration of the liquid crystal display panel of the touch sensor integrated type liquid crystal display according to the first embodiment of the invention, a further description may be briefly made or may be entirely omitted.

Figure 8:
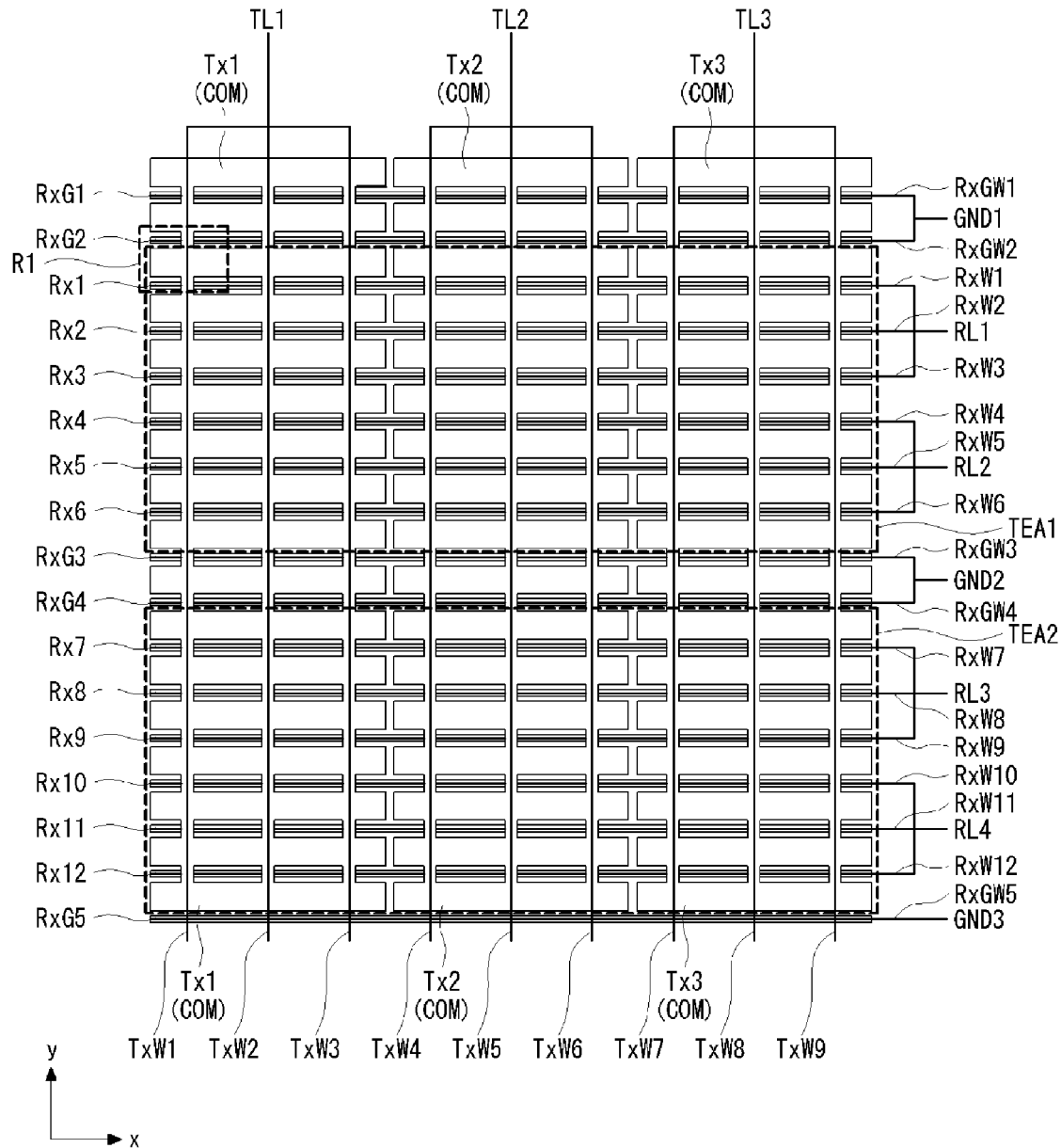
FIG. 8 is a plane view schematically showing an example of a touch effective area formed by touch driving electrodes and touch sensing electrodes in the touch sensor integrated type display device according to the second embodiment of the invention.
Figure 9A:
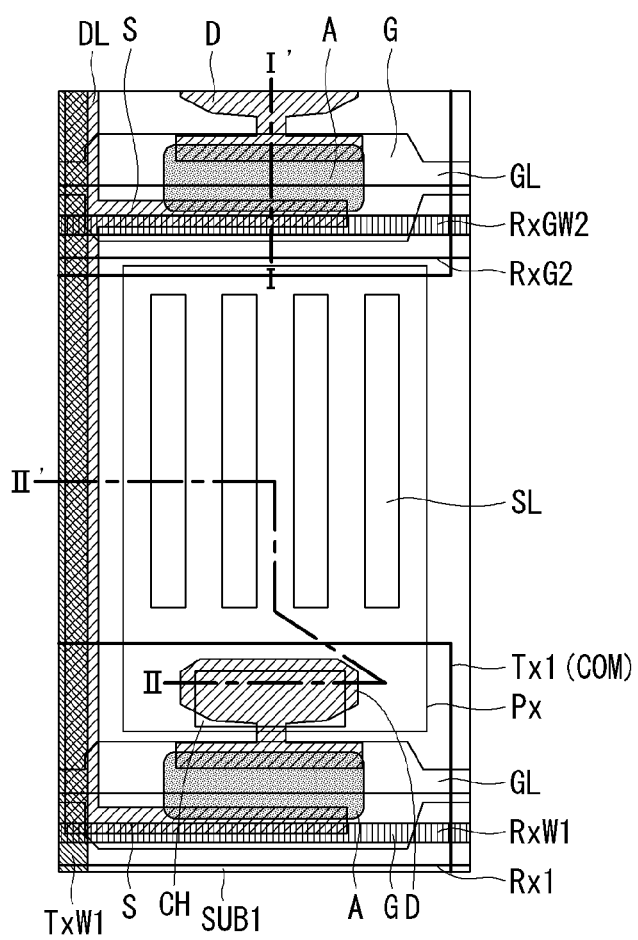
FIG. 9A is a plane view partially showing a touch effective area and a touch non-effective area shown in FIG. 8.
Figure 9B:
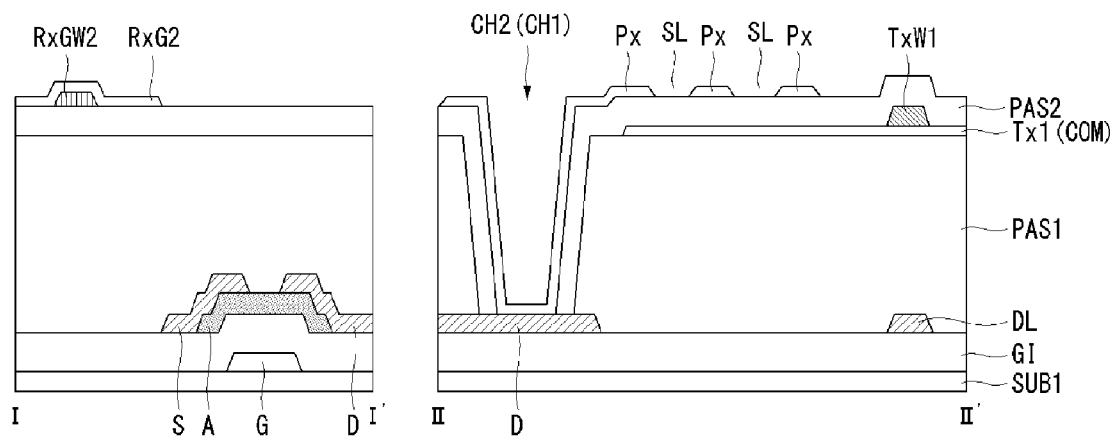
FIG. 9B is a cross-sectional view taken along lines I-I' and II-II' shown in FIG. 9A.

FIG. 8 is a plane view schematically showing an example of a touch effective area formed by touch driving electrodes and touch sensing electrodes in the touch sensor integrated type display device according to the second embodiment of the invention. FIG. 9A is a plane view showing a portion R1 of a touch effective area and a touch non-effective area shown in FIG. 8. FIG. 9B is a cross-sectional view taken along lines I-I' and II-II' shown in FIG. 9A.

As shown in FIGS. 8, 9A, and 9B, a common electrode COM of the touch sensor integrated type display device according to the second embodiment of the invention includes a plurality of common electrodes divided in a first direction (for example, x-axis direction) or a second direction (for example, y-axis direction). For example, FIG. 8 shows the plurality of common electrodes COM divided in the y-axis direction. The common electrodes COM serve as a plurality of touch driving electrodes Tx1, Tx2, and Tx3 constituting a touch sensor.

Each of the first to third touch driving electrodes Tx1, Tx2, and Tx3 arranged in the second direction includes a plurality of electrode patterns, and the plurality of electrode patterns are integrally connected to one another by at least one connection portion. In the example of FIG. 8, the neighboring electrode patterns are integrally connected to one another by three connection portions.

The first to third touch driving electrodes Tx1, Tx2, and Tx3 include touch driving electrode resistance reducing wires TxW1 to TxW3, TxW4 to TxW6, and TxW7 to TxW9 for reducing resistance of the first to third touch driving electrodes Tx1, Tx2, and Tx3, respectively. More specifically, the first touch driving electrode Tx1 contacts the three first touch driving electrode resistance reducing wires TxW1 to TxW3 arranged along the y-axis direction, and the second touch driving electrode Tx2 contacts the three second touch driving electrode resistance reducing wires TxW4 to TxW6 arranged along the y-axis direction. And also the third touch driving electrode Tx3 contacts the three third touch driving electrode resistance reducing wires TxW7 to TxW9 arranged along the y-axis direction. The first to third touch driving electrode resistance reducing wires TxW1 to TxW3, TxW4 to TxW6, and TxW7 to TxW9 are connected to the power supply unit 15 shown in FIG. 7 through first to third driving routing wires TL1, TL2, and TL3, respectively. The first to third touch driving electrode resistance reducing wires TxW1 to TxW3, TxW4 to TxW6, and TxW7 to TxW9 are formed of a metal material having a low resistance, for example, Al, AlNd, Mo, MoTi, Cu, Cr, Ag, and Ag-based alloys, so as to reduce the resistances of the first to third touch driving electrodes Tx1, Tx2, and Tx3 formed of a transparent conductive material such as indium tin oxide (ITO), indium zinc oxide (IZO), and gallium-doped zinc oxide (GZO).

In the touch sensor integrated type display device according to the second embodiment of the invention, the first to third touch driving electrodes Tx1 to Tx3 receive a common voltage Vcom through the power supply unit 15 shown in FIG. 7 during the display operation. Further, the first to third touch driving electrodes Tx1 to Tx3 receive a touch driving voltage Vtsp through the power supply unit 15 during the touch operation.

The touch sensor integrated type display device according to the second embodiment of the invention includes first to fifth touch non-sensing electrodes RxG1 to RxG5 and first to twelfth touch sensing electrodes Rx1 to Rx12 which are arranged in the first direction (for example, x-axis direction) so that they cross connection portions of the first to third touch driving electrodes Tx1 to Tx3 and the touch driving electrode resistance reducing wires TxW1 to TxW3, TxW4 to TxW6, and TxW7 to TxW9, and are separated from one another. The first to fifth touch non-sensing electrodes RxG1 to RxG5 and the first to twelfth touch sensing electrodes Rx1 to Rx12 are alternately disposed at a proper ratio. In the example of FIG. 8, the first to fifth touch non-sensing electrodes RxG1 to RxG5 and the first to twelfth touch sensing electrodes Rx1 to Rx12 are alternately disposed in such a manner that the two touch non-sensing electrodes RxG1 and RxG2 or RxG3 and RxG4 are disposed and then the six touch sensing electrodes Rx1 to Rx6 or Rx7 to Rx12 are disposed. However, the embodiment of the invention is not limited thereto. Namely, the disposition order and the disposition number of electrodes may be properly changed according to a need.

The first to fifth touch non-sensing electrodes RxG1 to RxG5 include first to fifth touch non-sensing electrode resistance reducing wires RxGW1 to RxGW5 for reducing resistance of the first to fifth touch non-sensing electrodes RxG1 to RxG5, respectively. The first and second touch non-sensing electrodes RTxG1 and RxG2 are connected to a first ground wire GND1 through the first and second touch non-sensing electrode resistance reducing wires RxGW1 and RxGW2. The third and fourth touch non-sensing electrodes RxG3 and RxG4 are connected to a second ground wire GND2 through the third and fourth touch non-sensing electrode resistance reducing wires RxGW3 and RxGW4. The fifth touch non-sensing electrode RxG5 is connected to a third ground wire GND3 through the fifth touch non-sensing electrode resistance reducing wire RxGW5. The first to third ground wires GND1 to GND3 are connected to ground.

When the first to twelfth touch sensing electrodes Rx1 to Rx12 are formed of a transparent metal material such as ITO, IZO, and GZO, the first to twelfth touch sensing electrodes Rx1 to Rx12 include first to twelfth touch sensing resistance reducing wires RxW1 to RxW12 formed of a metal material such as Al, AlNd, Mo, MoTi, Cu, Cr, Ag, and Ag-based alloys for reducing resistance of the first to twelfth touch sensing electrodes Rx1 to Rx12, respectively. However, if the first to twelfth touch sensing electrodes Rx1 to Rx12 are formed of the metal material such as Al, AlNd, Mo, MoTi, Cu, Cr, Ag, and Ag-based alloys, the first to twelfth touch sensing electrode resistance reducing wires do not need to be formed.

The first to third touch sensing electrodes Rx1 to Rx3 are connected to a first sensing routing wire RL1 through the first to third touch sensing electrode resistance reducing wires RxW1 to RxW3. The fourth to sixth touch sensing electrodes Rx4 to Rx6 are connected to a second sensing routing wire RL2 through the fourth to sixth touch sensing electrode resistance reducing wires RxW4 to RxW6. The seventh to ninth touch sensing electrodes Rx7 to Rx9 are connected to a third sensing routing wire RL3 through the seventh to ninth touch sensing electrode resistance reducing wires RxW7 to RxW9. The tenth to twelfth touch sensing electrodes Rx10 to Rx12 are connected to a fourth sensing routing wire RL4 through the tenth to twelfth touch sensing electrode resistance reducing wires RxW10 to RxW12.

In the touch sensor integrated type display device according to the second embodiment of the invention, the first to third touch sensing electrodes Rx1 to Rx3, the fourth to sixth touch sensing electrodes Rx4 to Rx6, the seventh to ninth touch sensing electrodes Rx7 to Rx9, and the tenth to twelfth touch sensing electrodes Rx10 to Rx12 are connected to the touch recognition processor 17 shown in FIG. 7 during the touch operation, and supply a change amount of mutual capacitance between the touch sensing electrodes and the touch driving electrodes before and after a touch event to the touch recognition processor 17. Hence, the touch recognition processor 17 may decides whether or not the touch event is generated, and a touch position.

On the other hand, because the first and second touch non-sensing electrodes RxG1 and RxG2 are connected to the first ground wire GND1 through the first and second touch non-sensing electrode resistance reducing wires RxGW1 and RxGW2, the third and fourth touch non-sensing electrodes RxG3 and RxG4 are connected to the second ground wire GND2 through the third and fourth touch non-sensing electrode resistance reducing wires RxGW3 and RxGW4, and the fifth touch non-sensing electrode RxG5 is connected to the third ground wire GND3 through the fifth touch non-sensing electrode resistance reducing wire RxGW5 are connected to ground through the ground wires GND1 to GND3, the first to fifth touch non-sensing electrodes RxG1 to RxG5 do not serve as the touch sensors.

In the second embodiment of FIG. 7, an area occupied by the first and second touch non-sensing electrodes RxG1 and RxG2, an area between the first and second touch non-sensing electrodes RxG1 and RxG2, an area occupied by the third and fourth touch non-sensing electrodes RxG3 and RxG4, an area between the third and fourth touch non-sensing electrodes RxG3 and RxG4, and an area occupied by the fifth touch non-sensing electrode RxG5 are touch non-effective areas, and only areas between the adjacent touch non-effective areas are touch effective areas. FIG. 8 shows a touch effective area including a first touch effective area TEA1 and a second touch effective area TEA2 as an example.

In the second embodiment of FIG. 8, a predetermined number of touch driving and touch non-sensing electrodes are present in the touch non-effective area, and the touch non-sensing electrodes present in the touch non-effective area are connected to ground. Hence, the mutual capacitance is not generated between the touch driving electrodes and the touch non-sensing electrodes present in the touch non-effective area. As a result, some of the touch driving electrodes and some of the touch non-sensing electrodes are not used as effective electrodes for the touch sensing. However, the size of the touch non-effective area is much less than the size of the touch effective area where the touch event is really generated, and the touch effective area is formed directly adjacent to the touch non-effective area. Therefore, although the touch non-effective area is present, it does not matter to the real touch recognition.

In the second embodiment of the invention illustrated in FIG. 8, the touch driving electrodes (i.e., the common electrodes) may correspond to the pixel electrodes of the display device, respectively. Alternatively, one touch driving electrode may correspond to the several to several tens of pixel electrodes of the display device.

In general, if all of the touch driving electrodes and the touch sensing electrodes are used as the effective electrodes, the touch driving electrodes and the touch sensing electrodes may be adjacent to each other at a very short distance therebetween, and also the number of crossings between the touch driving electrodes and the touch sensing electrodes may increase. In a general capacitive touch sensor, a unit touch effective block (i.e., a base unit for recognizing the touch operation) is configured so that it corresponds to several tens to several hundreds of pixel electrodes. Therefore, the mutual capacitance generated between the touch driving electrodes and the touch sensing electrodes in the touch sensor integrated type display device according to the second embodiment of the invention is several tens of times larger than the general capacitive touch sensor. A sharp increase in the mutual capacitance in the second embodiment of the invention may reduce the touch sensitivity and may increase a parasitic capacitance, thereby reducing a touch performance.

However, in the touch sensor integrated type display device according to the second embodiment of the invention illustrated in FIG. 8, as described above, the number of touch driving electrodes and the number of touch sensing electrodes used as the touch effective electrode may decrease by connecting the touch non-sensing electrodes to the ground. Thus, the mutual capacitance between the touch driving electrodes and the touch sensing electrodes may be reduced. Hence, a reduction in the touch sensitivity and an increase in the parasitic capacitance may be prevented, and the touch performance may be improved.

Furthermore, the touch driving electrodes or the touch sensing electrodes may be appropriately grouped using the driving routing wires and the sensing routing wires. Therefore, a touch recognition unit capable of recognizing the touch operation may be properly adjusted according to a need.

Although FIG. 8 illustrating the second embodiment of the invention concretely shows the number of touch non-sensing electrodes, the number of touch non-sensing electrode resistance reducing wires, the number of touch sensing electrodes, the number of touch sensing electrode resistance reducing wires, the number of touch driving electrodes, and the number of touch driving electrode resistance reducing wires, it should be understood that they are merely an example. Further, it should be understood that those skilled in the art may properly change the numbers according to a need.

Next, the structure of the touch sensor integrated type display device is described in detail with reference to FIGS. 8, 9A, and 9B.

As shown in FIGS. 8, 9A, and 9B, the touch sensor integrated type display device according to the second embodiment of the invention includes gate lines GL and data lines DL which are formed on the substrate SUB1 of the TFT array TFTA to cross each other, thin film transistors TFT respectively formed at crossings of the gate lines GL and the data lines DL, pixel electrodes Px formed in areas defined by a crossing structure of the gate lines GL and the data lines DL, and common electrodes COM positioned opposite the pixel electrodes Px. In the second embodiment of the invention, the common electrode COM serves as the touch driving electrode Tx1 as well as the common electrode COM. Therefore, in the following description, the common electrode COM is referred to as the touch driving electrode Tx1, the touch driving electrode Tx1 serving as the common electrode, or the common electrode COM serving as the touch driving electrode according to a need.

As shown in FIGS. 9A and 9B, the thin film transistor TFT includes a gate electrode G extending from the gate line GL, an active layer A which is formed on a gate insulation layer GI covering the gate line GL and the gate electrode G at a location corresponding to the gate electrode G, a source electrode S extending from the data line DL which is formed on a first passivation layer PAS1 covering the active layer A, and a drain electrode D positioned opposite the source electrode S. The thin film transistor TFT is covered by the first passivation layer PAS1, and a portion of the drain electrode D of the thin film transistor TFT is exposed through a contact hole CH formed in the first passivation layer PAS1.

The common electrode COM serving as the touch driving electrode Tx1 is formed on the first passivation layer PAS1 covering the thin film transistor TFT and the data line DL.

The touch driving electrode resistance reducing wire TxW1 is formed on the touch driving electrode Tx1 in the extension direction of the data line DL and reduces the resistance of the touch driving electrode Tx1.

A second passivation layer PAS2 is formed on the entire surface of the substrate SUB1, on which the touch driving electrode resistance reducing wire TxW1 and the touch driving electrode Tx1 are formed. First and second contact holes CH1 and CH2 passing through the first passivation layer PAS1 and the second passivation layer PAS2 are formed to expose a portion of the drain electrode D.

A touch non-sensing electrode resistance reducing wire RxGW2 for reducing the resistance of the touch non-sensing electrode RxG2 is formed along the gate ling GL in the touch non-effective area on the second passivation layer PAS2, on which the first and second contact holes CH1 and CH2 are formed. The touch sensing electrode resistance reducing wire RxW1 for reducing the resistance of the touch sensing electrode Rx1 is formed in the touch effective areas TEA1 along the gate ling GL.

The touch sensing electrodes Rx1 to Rx3 and the pixel electrode Px are formed on the second passivation layer PAS2, on which the touch sensing electrode resistance reducing wire RxW1 is formed, so as to cover the touch sensing electrode resistance reducing wires RxW1 to RxW3. The touch sensing electrode Rx1 is formed between the adjacent pixel electrodes Px with the gate line GL interposed therebetween, and extends along the gate line GL. The pixel electrode Px is formed in the area defined by the crossing of the gate line GL and the data line DL and is connected to the drain electrode D of the thin film transistor TFT exposed through the first and second contact holes CH1 and CH2.

In the touch sensor integrated type display device according to the second embodiment of the invention, as shown in FIGS. 9A and 9B, the touch driving electrode Tx1 formed on the first passivation layer PAS1 has no slit, and the pixel electrode Px formed on the second passivation layer PAS2 has slits SL.

Next, another example (modified example) of the touch recognition area formed by the touch driving electrode and the touch sensing electrode in the touch sensor integrated type display device according to the second embodiment of the invention is described with reference to FIG. 10.

A difference between the modified example illustrated in FIG. 10 and the second embodiment illustrated in FIG. 8 is as follows. In the second embodiment illustrated in FIG. 8, only the touch non-sensing electrodes RxG1-RxG2, RxG3-RxG4, and RxG5 are respectively connected to the ground wires GND1, GND2, and GND3 through the touch non-sensing electrode resistance reducing wires RxGW1-RxGW2, RxGW3-RxW4, and RxGW5, respectively. On the other hand, in the modified example illustrated in FIG. 10, some Rx1-Rx2, Rx9-Rx10, and Rx17 of the touch sensing electrodes and the touch non-driving electrodes TxG1, TxG2, and TxG3 are connected to ground through the ground wires.

Figure 10:
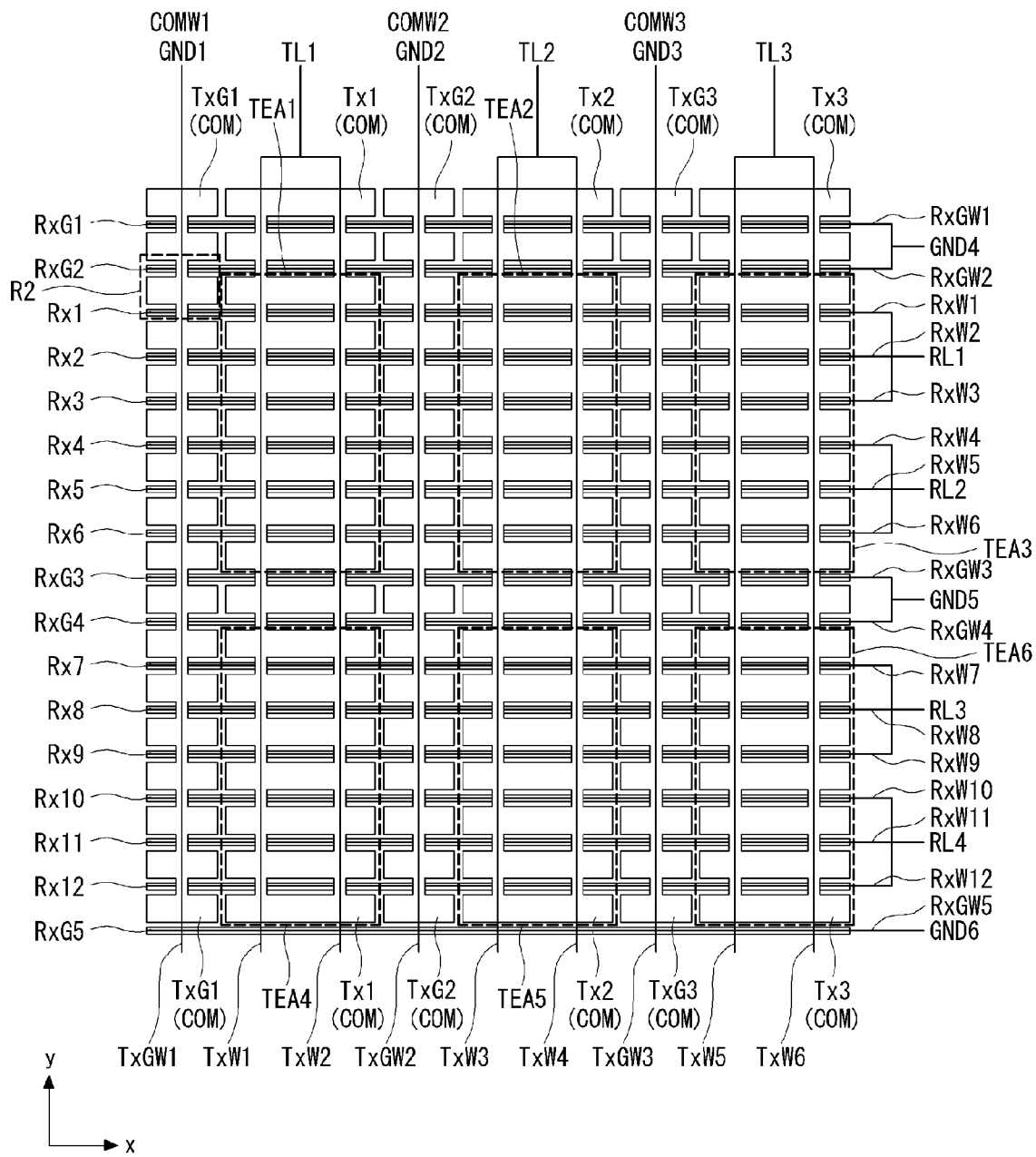
FIG. 10 is a plane view schematically showing another example of a touch effective area formed by touch driving electrodes and touch sensing electrodes in the touch sensor integrated type display device according to the second embodiment of the invention.
Figure 11A:
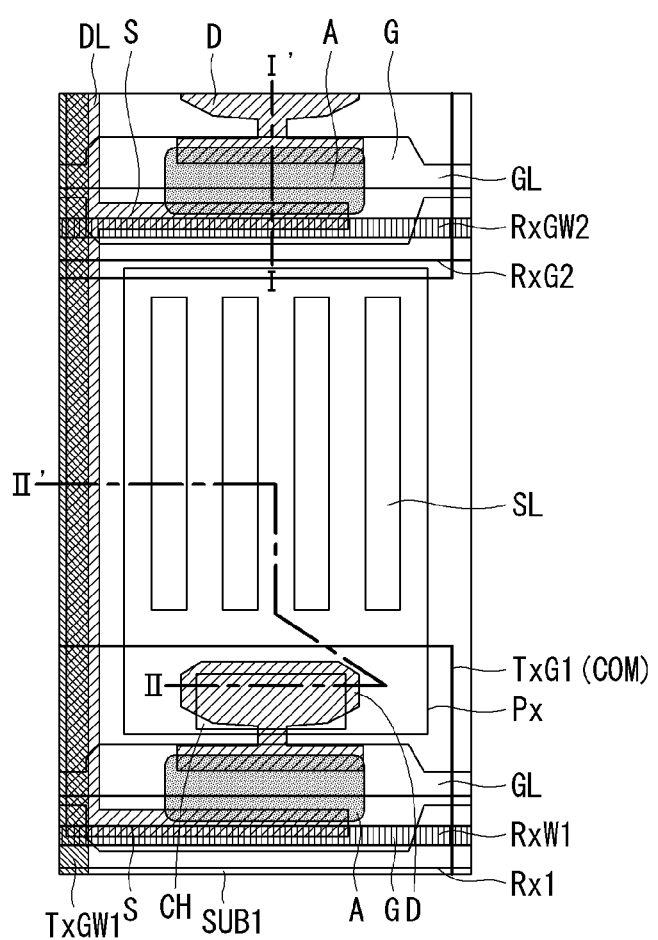
FIG. 11A is a plane view partially showing a touch effective area and a touch non-effective area shown in FIG. 10.
Figure 11B:
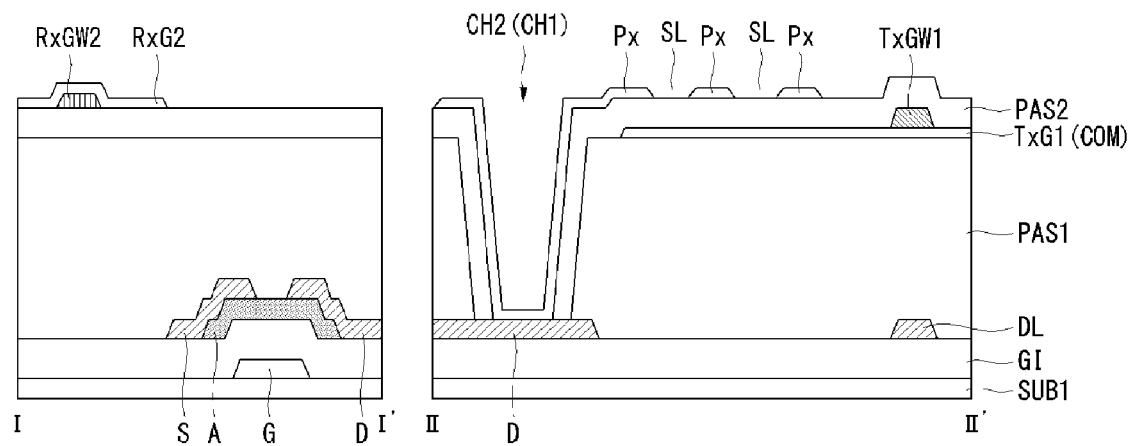
FIG. 11B is a cross-sectional view taken along lines I-I' and II-II' shown in FIG. 11A.

As shown in FIGS. 10, 11A and 11B, a common electrode COM of the touch sensor integrated type display device according to the modified example of the second embodiment of the invention includes a plurality of common electrodes divided in the first direction (for example, x-axis direction) or the second direction (for example, y-axis direction). For example, FIG. 10 shows the common electrodes COM divided in the y-axis direction. Some of the plurality of common electrodes COM serve as touch driving electrodes Tx1, Tx2, and Tx3, and the others of the plurality of common electrodes COM serve as touch non-driving electrodes TxG1, TxG2, and TxG3.

Each of the first to third touch driving electrodes Tx1, Tx2, and Tx3 arranged in the second direction (for example, y-axis direction) includes a plurality of electrode patterns, and the plurality of electrode patterns are integrally connected to one another by at least one connection portion. In the modified example of FIG. 10, the neighboring electrode patterns are integrally connected to one another by two connection portions as an example.

The first to third touch driving electrodes Tx1, Tx2, and Tx3 include first to third touch driving electrode resistance reducing wires TxW1-TxW2, TxW3-TxW4, and TxW5-TxW6 for reducing resistance of the first to third touch driving electrodes Tx1, Tx2, and Tx3, respectively. More specifically, the first touch driving electrode Tx1 contacts the two first touch driving electrode resistance reducing wires TxW1 and TxW2, the second touch driving electrode Tx2 contacts the two second touch driving electrode resistance reducing wires TxW3 and TxW4, and the third touch driving electrode Tx3 contacts the two third touch driving electrode resistance reducing wires TxW5 and TxW6. The first to third touch driving electrode resistance reducing wires TxW1-TxW2, TxW3-TxW4, and TxW5-TxW6 are connected to the power supply unit 15 through first to third driving routing wires TL1, TL2, and TL3, respectively.

The first to third touch non-driving electrodes TxG1 to TxG3 arranged in the y-axis direction and the first to third touch driving electrodes Tx1, Tx2, and Tx3 arranged in the y-axis direction are alternately disposed. In the modified example of the second embodiment illustrated in FIG. 10, the first to third touch non-driving electrodes TxG1 to TxG3 and the first to third touch driving electrodes Tx1, Tx2, and Tx3 are alternately disposed, and their sizes are different from each other. However, the embodiment of the invention is not limited thereto. Namely, the sizes of the electrodes, the number of touch driving electrodes and the number of touch non-driving electrodes connected to the routing wires or the ground wires, etc. may be properly changed according to a need.

The first to third touch non-driving electrodes TxG1 to TxG3 include first to third touch non-driving electrode resistance reducing wires for reducing resistance of the first to third touch non-driving electrodes TxG1 to TxG3, respectively. More specifically, the first touch non-driving electrode TxG1 contacts a first touch non-driving electrode resistance reducing wire TxGW1, the second touch non-driving electrode TxG2 contacts a second touch non-driving electrode resistance reducing wire TxGW2, and the third touch non-driving electrode TxG3 contacts a third touch non-driving electrode resistance reducing wire TxGW3. The first to third touch non-driving electrode resistance reducing wires TxGW1, TxGW2, and TxGW3 are connected to ground through first to third ground wires GND1, GND2, and GND3, respectively.

The modified example of the second embodiment shows that the first to third touch non-driving electrodes TxG1 to TxG3 respectively connected to the first to third ground wires GND1 to GND3 through the first to third touch non-driving electrode resistance reducing wires TxGW1 to TxGW3 are arranged in a line. However, the embodiment of the invention is not limited thereto. For example, the touch non-driving electrodes arranged in two or more lines may be connected to the ground wires, respectively.

In the touch sensor integrated type display device according to the modified example of the second embodiment of the invention, the first to third touch driving electrodes Tx1 to Tx3 receive a common voltage Vcom through the power supply unit 15 shown in FIG. 7 during the display operation. Further, the first to third touch driving electrodes Tx1 to Tx3 receive the common voltage Vcom through the power supply unit 15 during the touch operation. However, the first to third touch non-driving electrodes TxG1 to TxG3 receive the common voltage Vcom from the power supply unit 15 through first to third common wires COMW1, COMW2, and COMW3 during the display operation. On the other hand, the first to third touch non-driving electrodes TxG1 to TxG3 are connected to the ground through the first to third ground wires GND1 to GND3 during the touch operation. In the modified example illustrated in FIG. 10, the first to third common wires COMW1 to COMW3 and the first to third ground wires GND1 to GND3 are similar to those of the second embodiment. Namely, the wires may selectively perform the supply of the common voltage and the connection of the ground using the switching elements during the display operation and touch operation. It is a matter of course that the first to third common wires COMW1 to COMW3 and the first to third ground wires GND1 to GND3 may be separately formed. Namely, the first to third touch non-driving electrodes TxG1 to TxG3 may be connected to the power supply unit 15 through the first to third common wires COMW1 to COMW3 during the display operation. The first to third touch non-driving electrodes TxG1 to TxG3 may be connected to the ground through the first to third ground wires GND1 to GND3 during the touch operation.

As described above, because the first to third touch non-driving electrodes TxG1 to TxG3 connected to the first to third ground wires GND1 to GND3 are connected to the ground through the first to third ground wires GND1 to GND3, the first to third touch non-driving electrodes TxG1 to TxG3 do not serve as the touch sensor during the touch operation.

The touch sensor integrated type display device according to the modified example of the second embodiment of the invention includes first to fifth touch non-sensing electrodes RxG1 to RxG5 and first to twelfth touch sensing electrodes Rx1 to Rx12 which are arranged in the first direction (for example, x-axis direction) so that they cross connection portions of the first to third touch non-driving electrodes TxG1 to TxG3, the touch non-driving electrode resistance reducing wires TxGW1 to TxGW3, connection portions of the first to third touch driving electrodes Tx1 to Tx3, and the touch driving electrode resistance reducing wires TxW1 to TxW3. The first to fifth touch non-sensing electrodes RxG1 to RxG5 and first to twelfth touch sensing electrodes Rx1 to Rx12 are separated from one another. The first to fifth touch non-sensing electrodes RxG1 to RxG5 and the first to twelfth touch sensing electrodes Rx1 to Rx12 are alternately disposed at a proper ratio. In the modified example of FIG. 10, the first to fifth touch non-sensing electrodes RxG1 to RxG5 and the first to twelfth touch sensing electrodes Rx1 to Rx12 are alternately disposed in such a manner that the two touch non-sensing electrodes RxG1 and RxG2 or RxG3 and RxG4 are disposed and then the six touch sensing electrodes Rx1 to Rx6 or Rx7 to Rx12 are disposed. However, the embodiment of the invention is not limited thereto. Namely, the disposition order and the disposition number of electrodes may be properly changed according to a need.

The first to fifth touch non-sensing electrodes RxG1 to RxG5 include first to fifth touch non-sensing electrode resistance reducing wires RxGW1 to RxGW5 for reducing resistance of the first to fifth touch non-sensing electrodes RxG1 to RxG5, respectively. The first and second touch non-sensing electrodes RxG1 and RxG2 are connected to a fourth ground wire GND4 through the first and second touch non-sensing electrode resistance reducing wires RxGW1 and RxGW2. The third and fourth touch non-sensing electrodes RxG3 and RxG4 are connected to a fifth ground wire GND5 through the third and fourth touch non-sensing electrode resistance reducing wires RxGW3 and RxGW4. The fifth touch non-sensing electrode RxG5 is connected to a sixth ground wire GND6 through the fifth touch non-sensing electrode resistance reducing wire RxGW5. The fourth to sixth ground wires GND4 to GND6 are connected to ground.

When the first to twelfth touch sensing electrodes Rx1 to Rx12 are formed of a transparent metal material such as ITO, IZO, and GZO, the first to twelfth touch sensing electrodes Rx1 to Rx12 include first to twelfth touch sensing electrode resistance reducing wires RxW1 to RxW12 formed of a metal material such as Al, AlNd, Mo, MoTi, Cu, Cr, Ag, and Ag-based alloys for reducing resistance of the first to twelfth touch sensing electrodes Rx1 to Rx12, respectively. However, if the first to twelfth touch sensing electrodes Rx1 to Rx12 are formed of the metal material such as Al, AlNd, Mo, MoTi, Cu, Cr, Ag, and Ag-based alloys, the touch sensing electrode resistance reducing wires do not need to be formed. The first to third touch sensing electrodes Rx1 to Rx3 are connected to a first sensing routing wire RL1 through the first to third touch sensing electrode resistance reducing wires RxW1 to RxW3. The fourth to sixth touch sensing electrodes Rx4 to Rx6 are connected to a second sensing routing wire RL2 through the fourth to sixth touch sensing electrode resistance reducing wires RxW4 to RxW6. The seventh to ninth touch sensing electrodes Rx7 to Rx9 are connected to a third sensing routing wire RL3 through the seventh to ninth touch sensing electrode resistance reducing wires RxW7 to RxW9. The tenth to twelfth touch sensing electrodes Rx10 to Rx12 are connected to a fourth sensing routing wire RL4 through the tenth to twelfth touch sensing electrode resistance reducing wires RxW10 to RxW12.

In the touch sensor integrated type display device according to the modified example of the second embodiment of the invention, the first to third touch sensing electrodes Rx1 to Rx3, the fourth to sixth touch sensing electrodes Rx4 to Rx6, the seventh to ninth touch sensing electrodes Rx7 to Rx9, and the tenth to twelfth touch sensing electrodes Rx10 to Rx12 are connected to the touch recognition processor 17 shown in FIG. 7 through the first to fourth sensing routing wires RL1 to RL4 during the touch operation, and supply a change amount of mutual capacitance between the touch sensing electrodes and the touch driving electrodes before and after the touch event to the touch recognition processor 17. Hence, the touch recognition processor 17 may decides whether or not the touch event is generated, and a touch position.

On the other hand, because the first and second touch non-sensing electrodes RxG1 and RxG2 connected to the fourth ground wire GND4 through the first and second touch non-sensing electrode resistance reducing wires RxGW1 and RxGW2, the third and fourth touch non-sensing electrodes RxG3 and RxG4 connected to the fifth ground wire GND5 through the third and fourth touch non-sensing electrode resistance reducing wires RxGW3 and RxGW4, and the fifth touch non-sensing electrode RxG5 connected to the sixth ground wire GND6 through the fifth touch non-sensing electrode resistance reducing wire RxGW5 are connected to the ground through the fourth to sixth ground wires GND4 to GND6, the first to fifth touch non-sensing electrodes RxG1 to RxG5 do not serve as the touch sensors.

In the modified example of the second embodiment illustrated in FIG. 10, an area occupied by the first to third touch non-driving electrodes TxG1 to TxG3, an area occupied by the first and second touch non-sensing electrodes RxG1 and RxG2, an area between the first and second touch non-sensing electrodes RxG1 and RxG2, an area occupied by the third and fourth touch non-sensing electrodes RxG3 and RxG4, an area between the third and fourth touch non-sensing electrodes RxG3 and RxG4, and an area occupied by the fifth touch non-sensing electrode RxG5 are touch non-effective areas, and remaining areas except the touch non-effective areas are touch effective areas. FIG. 10 shows a touch effective area including first to sixth touch effective areas TEA1 to TEA6 as an example.

In the modified example of the second embodiment illustrated in FIG. 10, a predetermined number of touch non-driving electrodes and a predetermined number of touch non-sensing electrodes are present in the touch non-effective area, and the touch non-driving electrodes and the touch non-sensing electrodes present in the touch non-effective area are connected to ground. Hence, the mutual capacitance is not generated between the touch non-driving electrodes and the touch non-sensing electrodes present in the touch non-effective area. As a result, some of the touch non-driving electrodes and some of the touch non-sensing electrodes are not used as effective electrodes for the touch sensing. However, in the same manner as the second embodiment, the size of the touch non-effective area is much less than the size of the touch effective area where the touch event is really generated, and the touch effective area is formed directly adjacent to the touch non-effective area. Therefore, although the touch non-effective area is present, it does not matter to the real touch recognition.

In the modified example of the second embodiment of the invention illustrated in FIG. 10, the touch driving electrodes (i.e., the common electrodes) may correspond to the pixel electrodes of the display device, respectively. Alternatively, one touch driving electrode may correspond to several to several tens of pixel electrodes of the display device.

In general, if all of the touch driving electrodes and the touch sensing electrodes are used as the effective electrodes, the touch driving electrodes and the touch sensing electrodes may be adjacent to each other at a very short distance therebetween, and also the number of crossings between the touch driving electrodes and the touch sensing electrodes may increase. In a general capacitive touch sensor, a unit touch effective block (i.e., a base unit for recognizing the touch operation) is configured so that it corresponds to several tens to several hundreds of pixel electrodes. Therefore, the mutual capacitance generated between the touch driving electrodes and the touch sensing electrodes in the touch sensor integrated type display device according to the modified example of the second embodiment of the invention is several tens of times larger than the general capacitive touch sensor. A sharp increase in the mutual capacitance in the modified example may reduce the touch sensitivity and may increase a parasitic capacitance, thereby reducing a touch performance.

However, in the touch sensor integrated type display device according to the modified example of the second embodiment of the invention illustrated in FIG. 10, as described above, the number of touch driving electrodes and the number of touch sensing electrodes used as the touch effective electrode may further decrease compared to the second embodiment by connecting the touch non-driving electrodes and the touch non-sensing electrodes to the ground. Thus, the mutual capacitance between the touch driving electrodes and the touch sensing electrodes may be reduced. Hence, a reduction in the touch sensitivity and an increase in the parasitic capacitance may be prevented, and the touch performance may be further improved.

In the modified example of the second embodiment, the touch driving electrodes or the touch sensing electrodes may be appropriately grouped using the driving routing wires and the sensing routing wires in the same manner as the second embodiment. Therefore, a touch recognition unit capable of recognizing the touch operation may be properly adjusted according to a need.

Although FIG. 10 illustrating the modified example of the second embodiment of the invention concretely shows the number of touch non-driving electrodes, the number of touch non-driving electrode resistance reducing wires, the number of touch sensing electrodes, the number of touch sensing electrode resistance reducing wires, the number of touch non-sensing electrodes, and the number of touch non-sensing electrode resistance reducing wires, it should be understood that they are merely an example. Further, it should be understood that those skilled in the art may properly change the numbers according to a need. Since the structure of the touch sensor integrated type display device according to the modified example of the second embodiment illustrated in FIG. 10 is substantially the same as the second embodiment illustrated in FIG. 8 except that the first to third touch non-sensing electrodes RxG1 to RxG3 are respectively connected to the first to third ground wires GND1 to GND3 or the first to third common wires COMW1 to COMW3, a further description may be briefly made or may be entirely omitted.

Referring again to FIGS. 7, 8 and 10, the gate driver 13 sequentially outputs a gate pulse (or a scan pulse) under the control of the timing controller 11 in a display mode. The gate driver 13 shifts a swing voltage of the gate pulse to a gate high voltage VGH and a gate low voltage VGL. The gate pulse output from the gate driver 13 is synchronized with the data voltage output from the data driver 12 and is sequentially supplied to the gate lines G1 to Gm. The gate high voltage VGH is equal to or greater than a threshold voltage of the thin film transistor TFT, and the gate low voltage VGL is less than the threshold voltage of the thin film transistor TFT. A plurality of gate driving integrated circuits (ICs) of the gate driver 13 may be connected to the gate lines G1 to Gm formed on the first substrate SUBS1 of the TFT array TFTA through a tape automated bonding (TAB) process. Alternatively, the gate driving ICs of the gate driver 13 may be directly formed on the first substrate SUBS1 of the TFT array TFTA along with pixels through a gate-in-panel (GIP) process.

The data driver 12 samples and latches digital video data RGB under the control of the timing controller 11. The data driver 12 inverts a polarity of the data voltage of the digital video data RGB based on positive and negative gamma compensation voltages GMA1 to GMAn supplied from the power supply unit 15 and outputs the positive and negative data voltages. The positive and negative data voltages output from the data driver 12 are synchronized with the gate pulses output from the gate driver 13. A plurality of source driving ICs of the data driver 12 may be connected to the data lines D1 to Dn formed on the first substrate SUBS1 of the TFT array TFTA through a chip-on glass (COG) process or the TAB process. The source driving ICs may be integrated inside the timing controller 11 and thus may be implemented as one chip IC along with the timing controller 11.

The timing controller 11 generates timing control signals for controlling operation timings of the gate driver 13 and the data driver 12 using timing signals Vsync, Hsync, DE, and MCLK, which are received from the external host controller 10 and are used to drive the touch sensor integrated type display device. The timing control signals include a gate timing control signal for controlling the operation timing of the gate driver 13 and a data timing control signal for controlling the operation timing of the data driver 12 and the polarity of the data voltage.

The gate timing control signal includes a gate start pulse GSP, a gate shift clock GSC, a gate output enable signal GOE, and the like. The gate start pulse GSP is applied to a first gate driving IC of the gate driver 13, which will output a first gate pulse in each frame period, and controls a shift start timing of the first gate driving IC. The gate shift clock GSC is commonly input to the gate driving ICs of the gate driver 13 and also shifts the gate start pulse GSP. The gate output enable signal GOE controls output timings of the gate driving ICs of the gate driver 13.

The data timing control signal includes a source start pulse SSP, a source sampling clock SSC, a polarity control signal POL, a source output enable signal SOE, and the like. The source start pulse SSP is applied to a first source driving IC of the data driver 12 to firstly sample the data and controls a data sampling start timing. The source sampling clock SSC controls a sampling timing of data inside the source driving ICs based on a rising or falling edge thereof. The polarity control signal POL controls the polarity of the data voltage output from the source driving ICs. The source output enable signal SOE controls output timings of the source driving ICs. If the digital video data RGB is input to the data driver 12 through a mini low voltage differential signaling (LVDS) interface, the source start pulse SSP and the source sampling clock SSC may be omitted.

The power supply unit 15 is implemented as a DC-DC converter including a pulse width modulation (PWM) circuit, a boost converter, a regulator, a charge pump, a voltage divider, an operational amplifier, etc. The power supply unit 15 regulates a voltage input from the host controller 10 and generates voltages required to drive the liquid crystal display panel LCP, the data driver 12, the gate driver 13, the timing controller 11, and the backlight unit (not shown).

The voltages generated by the power supply unit 15 include a high potential power voltage VDD, the gate high voltage VGH, the gate low voltage VGL, the common voltage Vcom, positive and negative gamma reference voltages VGMA1 to VGMAn, the touch driving voltage Vtsp, and the like. The common voltage Vcom is supplied to all of the common electrodes COM under the control of the host controller 10 during the display operation. Alternatively, the common voltage Vcom may be supplied to all of the common electrodes COM under the control of the timing controller 11 during the display operation. The touch driving voltage Vtsp is supplied to the touch driving electrodes Tx1 to Tx3 under the control of the host controller 10 during the touch operation. Alternatively, the touch driving voltage Vtsp may be supplied to the touch driving electrodes Tx1 to Tx3 under the control of the timing controller 11 during the touch operation. The second embodiment of the invention shown in FIG. 7 describes that the touch driving voltage Vtsp is supplied to the touch driving electrodes Tx1 to Tx3 through the power supply unit 15, but is not limited thereto. For example, the touch driving voltage Vtsp may be supplied to the touch driving electrodes Tx1 to Tx3 through the touch recognition processor 17 controlled by the host controller 10 or the timing controller 11.

The host controller 10 transfers the digital video data RGB of an input image and the timing signals Vsync, Hsync, DE, and MCLK required to perform the display driving operation to the timing controller 11 through an interface, such as a low voltage difference signaling (LVDS) interface and a transition minimized differential signaling (TMDS) interface. When the display driving operation for displaying the image on the screen of the touch sensor integrated type liquid crystal display is performed, the host controller 10 supplies a control signal Vin to the power supply unit 15, so that the plurality of common electrodes COM may receive the common voltage Vcom of the same voltage level. Further, when the touch driving operation for the touch recognition is performed, the host controller 10 supplies the control signal Vin to the power supply unit 15, so that the touch driving voltage Vtsp may be supplied to the touch driving electrodes Tx1 to Tx3.

The touch recognition processor 17 differentially amplifies a voltage of an initial capacitance of each of the touch sensing electrodes Rx1-Rx3, Rx4-Rx6, Rx7-Rx9, and Rx10-Rx12 before a touch event and a voltage of a touch capacitance of each of the touch sensing electrodes Rx1-Rx3, Rx4-Rx6, Rx7-Rx9, and Rx10-Rx12 after the touch event. The touch recognition processor 17 then converts a result of the differential amplification into digital data. The touch recognition processor 17 decides a touch position based on a difference between the initial capacitance and the touch capacitance of each of the touch sensing electrodes Rx1-Rx3, Rx4-Rx6, Rx7-Rx9, and Rx10-Rx12 using a touch recognition algorithm and outputs touch coordinate data indicating the touch position to the host controller 10.

As described above, the first to third touch driving electrodes Tx1, Tx2, and Tx3 according to the second embodiment of the invention form touch driving lines in the y-axis direction, and the touch sensing electrodes Rx1-Rx3, Rx4-Rx6, Rx7-Rx9, and Rx10-Rx12 form touch sensing lines in the x-axis direction. Hence, they have a crossing configuration. Accordingly, if a touch event is generated on the touch sensor integrated type liquid crystal display, there may be a variation of the mutual capacitance between the touch driving lines and the touch sensing lines. It is possible to detect the touch position by measuring the variation of the mutual capacitance.

Since the structure of the touch sensor integrated type display device according to the modified example of the second embodiment illustrated in FIG. 10 is substantially the same as the second embodiment illustrated in FIG. 8 except that the first to third touch non-driving electrodes TxG1 to TxG3 are respectively connected to the first to third ground wires GND1 to GND3, a further description may be briefly made or may be entirely omitted.

As described above, the touch sensor integrated type display device according to the embodiments of the invention can use the common electrode, which is used to form an electric field required to drive the liquid crystals of the display device, along with the pixel electrode as the touch driving electrode or the touch sensing electrode, thereby making it possible to omit the process for forming the touch driving electrode or the touch sensing electrode and reduce a thickness of the touch sensor integrated type display device by a thickness of the touch driving electrode or the touch sensing electrode.

Furthermore, the touch sensor integrated type display device according to the embodiments of the invention can reduce the number of touch driving electrodes and the number of touch sensing electrodes used as the touch effective electrode by connecting some of the touch driving electrodes, some of the touch sensing electrodes, or some of the touch driving electrodes and some of the touch sensing electrodes to the ground. Hence, the touch sensor integrated type display device according to the embodiments of the invention can reduce the mutual capacitance between the touch driving electrodes and the touch sensing electrodes, thereby making it possible to prevent a reduction in the touch sensitivity and an increase in the parasitic capacitance and further improve the touch performance.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensor integrated type display device comprising:
   a plurality of gate lines and a plurality of data lines which are formed to cross over each other;
   a plurality of pixel electrodes respectively formed in areas defined by a crossing structure of the plurality of gate lines and the plurality of data lines;
   a plurality of first electrodes, each of which is formed between the pixel electrodes and in parallel with the gate line, the pixel electrodes being adjacent to each other with the gate line interposed therebetween;
   a plurality of second electrodes formed in parallel with the data lines, at least a portion of each of the plurality of second electrodes overlapping the pixel electrode;
   a plurality of first routing wires, each of which connects some of the plurality of first electrodes based on a first predetermined number to form a plurality of first electrode groups each including the some of the plurality of first electrodes arranged in a first direction;
   a plurality of second routing wires, each of which connects another some of the plurality of first electrodes based on a second predetermined number to form a plurality of second electrode groups each including the another some of the first plurality of electrodes arranged in the first direction; and
   a plurality of third routing wires, each of which connects some of the plurality of second electrodes based on a third predetermined number to form a plurality of third electrode groups each including the some of the plurality of second electrodes arranged in a second direction crossing the first direction,
   wherein the plurality of first electrode groups and the plurality of second electrode groups are alternately disposed, and a ratio of the number of first electrodes included in each first electrode group to the number of first electrodes included in each second electrode group is m:1, where m is a natural number,
   wherein the plurality of second routing wires are connected to ground,
   wherein each of the second electrodes includes a plurality of electrode patterns arranged in the first and second directions,
   wherein the electrode patterns neighbored in the second direction are connected by at least one connection portion, and
   wherein the first electrodes cross over the at least one connection portion.

2. The touch sensor integrated type display device of claim 1, further comprising a plurality of fourth routing wires, each of which connects another some of the plurality of second electrodes based on a fourth predetermined number to form a plurality of fourth electrode groups each including the another some of the plurality of second electrodes arranged in the second direction,
   wherein the plurality of third electrode groups and the fourth electrode groups are alternately disposed, and a ratio of the number of second electrodes included in each third electrode group to the number of second electrodes included in each fourth electrode group is n:1, where n is a natural number, and
   wherein the fourth routing wires are connected to a power supply unit supplying a common voltage during a display operation, and are connected to ground during a touch operation.

3. The touch sensor integrated type display device of claim 2, further comprising at least one first resistance reducing wire configured to overlap each of the plurality of first electrodes along a direction of the first electrodes and reduce resistances of the first electrodes,
   wherein the first electrodes of the second electrode group are connected to the second routing wires through the at least one first resistance reducing wire.

4. The touch sensor integrated type display device of claim 3, further comprising at least one second resistance reducing wire configured to overlap each of the plurality of second electrodes along a direction of the second electrodes and reduce resistances of the second electrodes, wherein the second electrodes of the fourth electrode group are connected to the fourth routing wires through the at least one second resistance reducing wire.

5. The touch sensor integrated type display device of claim 1, wherein in the first direction, the at least one connection portion has a thinner width than the neighboring second electrodes.

6. A touch sensor integrated type display device comprising:
a plurality of gate lines formed in parallel on a first substrate;
a gate insulating layer configured to cover the gate lines;
a plurality of data lines formed on the gate insulating layer to cross the gate lines;
a plurality of thin film transistors respectively formed in a plurality of pixel areas defined by a crossing structure of the gate lines and the data lines;
a first passivation layer configured to cover the gate insulating layer, on which the plurality of thin film transistors are formed;
a plurality of pixel electrodes formed on the first passivation layer in the plurality of pixel areas, respectively;
a plurality of first electrodes, each of which is formed between the pixel electrodes and in parallel with the gate line, the pixel electrodes being adjacent to each other with the gate line interposed therebetween;
a second passivation layer configured to cover the plurality of first electrodes;
a plurality of second electrodes formed on the second passivation layer in parallel with the data lines, at least a portion of each of the plurality of second electrodes overlapping the pixel electrode;
a plurality of first routing wires, each of which connects some of the plurality of first electrodes based on a first predetermined number to form a plurality of first electrode groups each including the some of the plurality of first electrodes arranged in a first direction;
a plurality of second routing wires, each of which connects another some of the plurality of first electrodes based on a second predetermined number to form a plurality of second electrode groups each including the another some of the first plurality of electrodes arranged in the first direction; and
a plurality of third routing wires, each of which connects some of the plurality of second electrodes based on a third predetermined number to form a plurality of third electrode groups each including the some of the plurality of second electrodes arranged in a second direction crossing the first direction,
wherein the plurality of first electrode groups and the plurality of second electrode groups are alternately disposed, and a ratio of the number of first electrodes included in each first electrode group to the number of first electrodes included in each second electrode group is m:1, where m is a natural number,
wherein the plurality of second routing wires are connected to ground,
wherein each of the second electrodes includes a plurality of electrode patterns arranged in the first and second directions,
wherein the electrode patterns neighbored in the second direction are connected by at least one connection portion, and wherein the first electrodes cross over the at least one connection portion.

7. The touch sensor integrated type display device of claim 6, further comprising a plurality of fourth routing wires, each of which connects another some of the plurality of second electrodes based on a fourth predetermined number to form a plurality of fourth electrode groups each including the another some of the plurality of second electrodes arranged in the second direction,
wherein the plurality of third electrode groups and the fourth electrode groups are alternately disposed, and a ratio of the number of second electrodes included in each third electrode group to the number of second electrodes included in each fourth electrode group is n:1, where n is a natural number, and
wherein the fourth routing wires are connected to a power supply unit supplying a common voltage during a display operation, and are connected to ground during a touch operation.

8. The touch sensor integrated type display device of claim 7, further comprising at least one first resistance reducing wire configured to overlap each of the plurality of first electrodes along a direction of the first electrodes and reduce resistances of the first electrodes,
wherein the first electrodes of the second electrode group are connected to the second routing wires through the at least one first resistance reducing wire.

9. The touch sensor integrated type display device of claim 8, further comprising at least one second resistance reducing wire configured to overlap each of the plurality of second electrodes along a direction of the second electrodes and reduce resistances of the second electrodes,
wherein the second electrodes of the fourth electrode group are connected to the fourth routing wires through the at least one second resistance reducing wire.

10. The touch sensor integrated type display device of claim 6, wherein in the first direction, the at least one connection portion has a thinner width than the neighboring second electrodes.

11. A touch sensor integrated type display device comprising:
a plurality of gate lines formed in parallel on a first substrate;
a gate insulating layer configured to cover the gate lines;
a plurality of data lines formed on the gate insulating layer to cross the gate lines;
a plurality of thin film transistors respectively formed in a plurality of pixel areas defined by a crossing structure of the gate lines and the data lines;
a first passivation layer configured to cover the gate insulating layer, on which the plurality of thin film transistors are formed;
a plurality of first electrodes, each of which is formed on the first passivation layer in parallel with the data lines and formed in at least two pixel areas, which are adjacent to each other with the gate line interposed therebetween;
a second passivation layer configured to cover the plurality of first electrodes;
a plurality of pixel electrodes formed on the second passivation layer in the plurality of pixel areas, respectively, at least a portion of each of the plurality of pixel electrodes overlapping the first electrode;
a plurality of second electrodes, each of which is formed on the second passivation layer in parallel with the gate line and are formed between the pixel electrodes and in parallel with the gate line, the pixel electrodes being adjacent to each other with the gate line interposed therebetween;

a plurality of first routing wires, each of which connects some of the plurality of second electrodes based on a first predetermined number to form a plurality of first electrode groups each including the some of the plurality of second electrodes arranged in a first direction;

a plurality of second routing wires, each of which connects another some of the plurality of second electrodes based on a second predetermined number to form a plurality of second electrode groups each including the another some of the plurality of second electrodes arranged in the first direction; and a plurality of third routing wires, each of which connects some of the plurality of first electrodes based on a third predetermined number to form a plurality of third electrode groups each including the some of the plurality of first electrodes arranged in a second direction crossing the first direction, wherein the plurality of first electrode groups and the plurality of second groups are alternately disposed, and a ratio of the number of second electrodes included in each first electrode group to the number of second electrodes included in each second electrode group is m:1, where m is a natural number, wherein the plurality of second routing wires are connected to ground, wherein each of the second electrodes includes a plurality of electrode patterns arranged in the first and second directions, wherein the electrode patterns neighbored in the second direction are connected by at least one connection portion, and wherein the first electrodes cross over the at least one connection portion.

12. The touch sensor integrated type display device of claim 11, further comprising a plurality of fourth routing wires, each of which connects the anther some of the plurality of first electrodes based on a fourth predetermined number to form a plurality of fourth electrode groups each including the first electrodes arranged in the second direction, wherein the third electrode groups and the fourth electrode groups are alternately disposed, and a ratio of the number of first electrodes included in each third electrode group to the number of first electrodes included in each fourth electrode group is n:1, where n is a natural number, wherein the fourth routing wires are connected to a power supply unit supplying a common voltage during a display operation is performed, and are connected to ground during a touch operation.

13. The touch sensor integrated type display device of claim 12, further comprising at least one first resistance reducing wire configured to overlap each of the plurality of second electrodes along a direction of the second electrodes and reduce resistances of the second electrodes, wherein the second electrodes of the second electrode group are connected to the second routing wires through the at least one first resistance reducing wire.

14. The touch sensor integrated type display device of claim 13, further comprising at least one second resistance reducing wire configured to overlap each of the plurality of first electrodes along a direction of the first electrodes and reduce resistances of the first electrodes, wherein the first electrodes of the fourth electrode group are connected to the fourth routing wires through the at least one second resistance reducing wire.

15. The touch sensor integrated type display device of claim 13, wherein in the first direction, the at least one connection portion has a thinner width than the neighboring second electrodes.

* * * * *